(12) United States Patent
Bae et al.

(10) Patent No.: US 10,904,304 B2
(45) Date of Patent: Jan. 26, 2021

(54) CLOUD STREAMING SERVICE SYSTEM, DATA COMPRESSING METHOD FOR PREVENTING MEMORY BOTTLENECKING, AND DEVICE FOR SAME

(71) Applicant: SK PLANET CO., LTD., Seongnam-si (KR)

(72) Inventors: Tae-Meon Bae, Seoul (KR); Hyun-Sik Na, Bucheon-si (KR); Hong-Seo Yun, Incheon (KR); Jung-Keun Yang, Seoul (KR); Dong-Su Lee, Seongnam-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

(21) Appl. No.: 16/505,144

(22) Filed: Jul. 8, 2019

(65) Prior Publication Data
US 2019/0334965 A1 Oct. 31, 2019

Related U.S. Application Data

(63) Continuation of application No. 15/406,594, filed on Jan. 13, 2017, now Pat. No. 10,397,288, which is a (Continued)

(30) Foreign Application Priority Data

Jul. 14, 2014 (KR) .................. 10-2014-0088548
Aug. 4, 2014 (KR) .................. 10-2014-0099994
Aug. 20, 2014 (KR) .................. 10-2014-0108120

(51) Int. Cl.
*H04L 29/06* (2006.01)
*H04L 12/26* (2006.01)
(Continued)

(52) U.S. Cl.
CPC ...... *H04L 65/4069* (2013.01); *H04L 43/0817* (2013.01); *H04L 43/0823* (2013.01);
(Continued)

(58) Field of Classification Search
CPC ............ H04L 65/4069; H04L 43/0817; H04L 43/0823; H04L 43/50; H04L 47/12;
(Continued)

(56) References Cited

U.S. PATENT DOCUMENTS 10,142,259 B2 * 11/2018 Phillips ................... H04L 65/60
2010/0167809 A1 7/2010 Perlman et al.
(Continued)

FOREIGN PATENT DOCUMENTS

CN 102904914 A 1/2013
CN 10/3179384 A 6/2013
(Continued)

OTHER PUBLICATIONS

China National Intellectual Property Administration, Office Action, CN Patent Application No. 201580047076.2, dated Jul. 6, 2020, 17 pages.
(Continued)

*Primary Examiner* — Jerry B Dennison
(74) *Attorney, Agent, or Firm* — Fenwick & West LLP

(57) ABSTRACT

The present invention relates to a cloud streaming service system, a data compressing method for preventing memory bottlenecking, and a device for same and, particularly, to a technology that: can prevent memory bottlenecking by compressing data when the transmitted amount of original buffer data exceeds a reference value, based on a system memory bandwidth; can provide a cloud streaming service by applying an order of priority by service type according to whether the processing limit, for the number of simultaneous connecting entities that can be processed by one server, is
(Continued)

reached during a cloud streaming service; and can test whether a sever that provides a cloud streaming service is operating normally and whether a connection error occurs.

15 Claims, 11 Drawing Sheets

Related U.S. Application Data continuation of application No. PCT/KR2015/007261, filed on Jul. 13, 2015.

(51) Int. Cl.
*H04N 21/20* (2011.01)
*H04N 21/23* (2011.01)
*H04N 21/234* (2011.01)
*H04N 21/24* (2011.01)
*H04L 12/801* (2013.01)
*H04L 12/835* (2013.01)
*H04L 29/08* (2006.01)

(52) U.S. Cl.
CPC .............. *H04L 43/50* (2013.01); *H04L 47/12* (2013.01); *H04L 47/30* (2013.01); *H04L 65/607* (2013.01); *H04N 21/20* (2013.01); *H04N 21/23* (2013.01); *H04N 21/234* (2013.01); *H04N 21/24* (2013.01); *H04L 67/10* (2013.01)

(58) Field of Classification Search
CPC ....... H04L 47/30; H04L 65/607; H04L 67/10; H04N 21/20; H04N 21/23; H04N 21/234; H04N 21/24

See application file for complete search history.

(56) References Cited

U.S. PATENT DOCUMENTS

| | | |
|---|---|---|
| 2013/0155075 A1 | 6/2013 | Matsui et al. |
| 2013/0227634 A1* | 8/2013 | Pal .......................... G06F 21/552 726/1 |
| 2013/0268688 A1* | 10/2013 | Galanes ................ H04L 65/605 709/231 |
| 2013/0342550 A1 | 12/2013 | Yang et al. |
| 2016/0004718 A1* | 1/2016 | Lin ......................... G06F 16/128 707/690 |
| 2017/0126763 A1* | 5/2017 | Bae ......................... H04N 21/23 |

FOREIGN PATENT DOCUMENTS

| | | |
|---|---|---|
| CN | 10/3514920 A | 1/2014 |
| KR | 10-20060105556 A | 10/2006 |
| KR | 10-1403321 A | 6/2014 |

OTHER PUBLICATIONS

European Patent Office, Communication pursuant to Article 94(3) EPC, EP Patent Application No. 15822844.5, dated Sep. 9, 2020, five pages.

* cited by examiner

CLOUD STREAMING SERVICE SYSTEM, DATA COMPRESSING METHOD FOR PREVENTING MEMORY BOTTLENECKING, AND DEVICE FOR SAME

CROSS-REFERENCE TO RELATED APPLICATION

The present application is a continuation of U.S. application Ser. No. 15/406,594, filed on Jan. 13, 2017, titled "CLOUD STREAMING SERVICE SYSTEM, DATA COMPRESSING METHOD FOR PREVENTING MEMORY BOTTLENECKING, AND DEVICE FOR SAME," which is a continuation of International Patent Application No. PCT/KR2015/007261, filed on Jul. 13, 2015, which claims priorities to and benefits of Korean Patent Application Nos. 10-2014-0088548, filed on Jul. 14, 2014, 10-2014-0099994, filed on Aug. 4, 2014, and 10-2014-0108120, filed on Aug. 20, 2014, each of which are hereby incorporated by reference herein in their entireties.

TECHNICAL FIELD

The present invention relates to a cloud streaming service system, a data compressing method for preventing a memory bottleneck, and an apparatus therefor. More particularly, this invention relates to techniques for preventing a memory bottleneck by compressing data when traffic of original buffer data exceeds a reference value based on a system memory bandwidth, for providing a cloud streaming service by applying priorities to service types depending on a processing limit of a single server in view of simultaneous log-ins, and for testing a normal operation and connection error of a server for providing a cloud streaming service.

BACKGROUND

The remarkable growth of Internet has resulted in a rapid increase in personal communication speed. Such a communication speed improvement offers an environment capable of downloading or uploading a large amount of data through access to a computer located at a remote place, or capable of using such a remote computer through a control program thereof as if being locally logged in the remote computer.

In addition, a cloud streaming service based on screen virtualization is attracting attention. In the cloud streaming service, a server runs an application, compresses a running screen through video encoding, and sends the compressed screen to a client. Then the client plays a transmitted video as if the application is running at his or her device.

In this cloud streaming, a capture unit delivers original buffer data to an encoding unit, which delivers data, encoded from input buffer data, to a transmission unit, thus providing a service to a client. In this case, if the number of simultaneous sessions increases and thereby data traffic reaches a system memory bandwidth limit, a memory bottleneck occurs due to such data traffic. Therefore, even though other resources are available, a service becomes unavailable. Particularly, the original buffer data obtained by the capture unit is RGBA occupying four bytes per pixel, thus resulting in width*height*4 and increasing the amount of data per frame having to be transmitted to the input unit. Accordingly, when the number of sessions or a frame rate increases, the system memory bandwidth rapidly reaches the limit.

Meanwhile, since the server runs an application, compresses a running screen through video encoding, and sends the compressed screen to the client, the client may use a cloud streaming service based on screen virtualization by playing a transmitted video as if the application is running at his or her device.

In order to increase the number of simultaneous accessing users, this cloud streaming service system may process a service in parallel by using a streaming pipeline for simultaneously processing the cloud streaming service step by step. However, since many applications corresponding to the number of simultaneous assessing users are running at the server, the use of the server is concentrated on a central processing unit (CPU) and a memory bus even though using the streaming pipeline. This may often cause a bottleneck to such sections and also invite system instability. Therefore, the maximum number of simultaneous assessing users that can be processed may be limited.

Further, in a computing environment based on this cloud streaming service, main services or functions are executed at the server. Therefore, technique for detecting in advance any failure of the server is required.

Relevant techniques are disclosed in Korean Patent Publication Nos. 10-2013-0025987 (Title: Image processing system of image change adaptation), published on Mar. 13, 2013, 10-2012-0062758 (Title: System for adaptively streaming audio objects), published on Jun. 14, 2012, and 10-2011-0012740 (Title: Device and method for detecting duplicate contents), published on Apr. 12, 2011.

SUMMARY

An object of the present invention is to increase the number of simultaneous service users by preventing a bottleneck caused by excessive data traffic in a cloud streaming service.

Additionally, an object of the present invention is to allow an effective use of resources for data delivery by compressing and offering a changed frame except any unchanged frame when providing a cloud streaming service screen to a user's terminal.

An object of the present invention is to service more applications without causing a bottleneck or affecting a service quality when providing a cloud streaming service.

Also, an object of the present invention is to provide a cloud streaming service more effectively by adjusting a service method depending on whether clients' service requests are concentrated or not.

Further, an object of the present invention is to provide a method, apparatus and system for testing whether a server for providing a cloud streaming service is operating normally or not.

Moreover, an object of the present invention is to effectively perform a failure test with only a single cloud streaming server and to prevent the spread of a test error due to a wrong reference result when detecting a failure of the cloud streaming server by comparing a test result on basis of a result corresponding to a normal operation of a cloud streaming system.

Technical Solution

In order to achieve the above objects, a cloud streaming server according to this invention includes a capture unit configured to capture a cloud streaming service screen; an encoding unit configured to load the captured cloud streaming service screen from a buffer for temporarily storing the captured cloud streaming service screen, and to encode the loaded cloud streaming service screen; a communication unit configured to transmit the encoded cloud streaming service screen to a terminal device; and a compression unit configured to determine whether a bottleneck occurs in the buffer, and to compress the cloud streaming service screen depending on a determination result.

In the cloud streaming server, the compression unit may determine, based on a data storage rate of the buffer, whether the bottleneck occurs.

In the cloud streaming server, if the data storage rate of the buffer exceeds a predetermined reference storage rate, the compression unit may determine that the bottleneck occurs in the buffer.

In the cloud streaming server, the compression unit may select one or more identical frames, which are identical with previous frames, from among frames corresponding to the cloud streaming service screen, and convert the one or more identical frames into a flag for indicating that the one or more identical frames are identical with the previous frames.

In the cloud streaming server, the compression unit may encode a format of image data corresponding to the cloud streaming service screen into a format to reduce capacity.

In the cloud streaming server, the compression unit may determine, based on a data increase rate of the buffer, whether the bottleneck occurs.

In the cloud streaming server, the compression unit may calculate the data increase rate at regular intervals. If the data increase rate is greater than a predetermined reference increase rate, it may be determined that a bottleneck occurs in the buffer.

In the cloud streaming server, if the cloud streaming service screen loaded from the buffer is in a compressed state, the encoding unit may decompress the loaded screen and then encode the decompressed screen.

Additionally, a data compression method in a cloud streaming service includes steps of capturing a cloud streaming service screen; compressing the captured cloud streaming service screen depending on a result of determining whether a bottleneck occurs in a buffer for temporarily storing the captured cloud streaming service screen; encoding the compressed cloud streaming service screen loaded from the buffer; and transmitting the encoded cloud streaming service screen to a terminal device.

In the data compression method, the compressing step may include determining, based on a data storage rate of the buffer, whether the bottleneck occurs.

In the data compression method, the compressing step may include, if the data storage rate of the buffer exceeds a predetermined reference storage rate, determining that the bottleneck occurs in the buffer.

In the data compression method, the compressing step may include selecting one or more identical frames, which are identical with previous frames, from among frames corresponding to the cloud streaming service screen, and converting the one or more identical frames into a flag for indicating that the one or more identical frames are identical with the previous frames.

In the data compression method, the compressing step may include encoding a format of image data corresponding to the cloud streaming service screen into a format to reduce capacity.

In the data compression method, the compressing step may include determining, based on a data increase rate of the buffer, whether the bottleneck occurs.

In the data compression method, the compressing step may include calculating the data increase rate at regular intervals. If the data increase rate is greater than a predetermined reference increase rate, the compressing step may include determining that a bottleneck occurs in the buffer.

In the data compression method, if the cloud streaming service screen loaded from the buffer is in a compressed state, the encoding step may include decompressing the loaded screen and then encoding the decompressed screen.

Additionally, a cloud streaming service system according to this invention includes a cloud streaming server configured to capture a cloud streaming service screen, to load the captured cloud streaming service screen from a buffer, to encode the loaded cloud streaming service screen, to transmit the encoded cloud streaming service screen to a terminal device, to determine whether a bottleneck occurs in the buffer, and to compress the cloud streaming service screen depending on a determination result; and the terminal device configured to receive an application execution resultant screen corresponding to the cloud streaming service from the cloud streaming server.

Further, in order to achieve the above objects, a cloud streaming server according to this invention includes a receiving unit configured to receive a service request from a user's terminal device; a service type identifying unit configured to identify a type of a cloud streaming service corresponding to the service request; a service priority setting unit configured to assign a priority to the cloud streaming service, based on the type of the cloud streaming service; and a service providing unit configured to determine whether a streaming pipeline capable of simultaneously processing in parallel the cloud streaming service reaches a limit of simultaneous service processing, and to provide the cloud streaming service according to the priority, based on a result of determination.

In the cloud streaming server, the service type identifying unit may detect an OPEN command for setting an audio device in the cloud streaming service and identify whether the type of the cloud streaming service is a video.

In the cloud streaming server, if the OPEN command is detected, the service type identifying unit may determine that the video is played, and identify that the type of the cloud streaming service is the video.

In the cloud streaming server, the service type identifying unit may ignore the OPEN command detected when no service request is received at the beginning of an execution of an application corresponding to the service request. Also, if the OPEN command is detected after the service request is received, the service type identifying unit may identify that the type of the cloud streaming service is the video.

In the cloud streaming server, if a Sound Open function is detected when an application corresponding to the service request is captured, the service type identifying unit may identify that the type of the cloud streaming service is the video.

In the cloud streaming server, the service priority setting unit may assign a lower priority to the cloud streaming service having the type of a video than the cloud streaming service having a certain type other than a video.

In the cloud streaming server, if the streaming pipeline does not reach the simultaneous service processing limit, the service providing unit may provide the cloud streaming service to the terminal device regardless of priority as soon as the service is requested.

In the cloud streaming server, if the number of cloud streaming services simultaneously processed in the streaming pipeline is equal to or greater than the predetermined number of simultaneous processing, the service providing unit may determine that the streaming pipeline reaches the simultaneous service processing limit.

In the cloud streaming server, the predetermined number of simultaneous processing may be smaller than the maximum number of cloud streaming services which are simultaneously processable in the streaming pipeline.

Additionally, a service processing method depending on a cloud streaming service type according to this invention includes steps of receiving a service request from a user's terminal device; identifying a type of a cloud streaming service corresponding to the service request; assigning a priority to the cloud streaming service, based on the type of the cloud streaming service; determining whether a streaming pipeline capable of simultaneously processing in parallel the cloud streaming service reaches a limit of simultaneous service processing; providing the cloud streaming service according to the priority, based on a result of determination.

In the service processing method, the service type identifying step may detect an OPEN command for setting an audio device in the cloud streaming service and identify whether the type of the cloud streaming service is a video.

In the service processing method, if the OPEN command is detected, the service type identifying step may determine that the video is played, and identify that the type of the cloud streaming service is the video.

In the service processing method, the service type identifying step may ignore the OPEN command detected when no service request is received at the beginning of an execution of an application corresponding to the service request. Also, if the OPEN command is detected after the service request is received, the service type identifying step may identify that the type of the cloud streaming service is the video.

In the service processing method, if a Sound Open function is detected when an application corresponding to the service request is captured, the service type identifying step may identify that the type of the cloud streaming service is the video.

In the service processing method, the priority assigning step may assign a lower priority to the cloud streaming service having the type of a video than the cloud streaming service having a certain type other than a video.

In the service processing method, if the streaming pipeline does not reach the simultaneous service processing limit, the service providing step may provide the cloud streaming service to the terminal device regardless of priority as soon as the service is requested.

In the service processing method, if the number of cloud streaming services simultaneously processed in the streaming pipeline is equal to or greater than the predetermined number of simultaneous processing, the service providing step may determine that the streaming pipeline reaches the simultaneous service processing limit.

In the service processing method, the predetermined number of simultaneous processing may be smaller than the maximum number of cloud streaming services which are simultaneously processable in the streaming pipeline.

Also, in order to achieve the above objects, this invention provides a computer program stored in a medium for executing the above-discussed method.

Additionally, a cloud streaming service system according to this invention includes a cloud streaming server configured to receive a service request from a user's terminal device, to identify a type of a cloud streaming service corresponding to the service request, to assign a priority to the cloud streaming service, based on the type of the cloud streaming service, to determine whether a streaming pipeline reaches a limit of simultaneous service processing, and to provide the cloud streaming service according to the priority, based on a result of determination; and the terminal device configured to receive an application execution resultant screen corresponding to the cloud streaming service from the cloud streaming server.

Further, in order to achieve the above objects, a cloud streaming server test device according to this invention includes a virtual client module configured to receive a test result corresponding to a predetermined test script key input from a cloud streaming server, and to create a test resultant video; a comparison unit configured to compare a reference image corresponding to a normal operation of the cloud streaming server with a test resultant image created by capturing the test resultant video; and a test control unit configured to determine, based on a result of comparison, whether there is a failure in the cloud streaming server.

In the cloud streaming server test device, the reference image may be created by capturing a normal operation resultant video which is created using a result of the normal operation of the cloud streaming server corresponding to the predetermined test script key input.

In the cloud streaming server test device, a screen created at an application by the predetermined test script key input may be a screen from which an animation effect is excluded.

In the cloud streaming server test device, the test control unit may determine that the cloud streaming server has no failure when the reference image and the test resultant image are identical with each other, and the test control unit may determine that the cloud streaming server has a failure when the reference image and the test resultant image are not identical.

In the cloud streaming server test device, the test resultant image may be captured at the same time point as the reference image.

Additionally, a cloud streaming server test method according to this invention includes steps of creating a reference image corresponding to a normal operation of a cloud streaming server; at a virtual client module, receiving a test result corresponding to a predetermined test script key input from the cloud streaming server and then creating a test resultant video; comparing the reference image with a test resultant image created by capturing the test resultant video; and determining, based on a result of comparison, whether there is a failure in the cloud streaming server.

In the cloud streaming server test method, the reference image may be created by capturing a normal operation resultant video which is created using a result of the normal operation of the cloud streaming server corresponding to the predetermined test script key input.

In the cloud streaming server test method, a screen created at an application by the predetermined test script key input may be a screen from which an animation effect is excluded.

In the cloud streaming server test method, the determining step may determine that the cloud streaming server has no failure when the reference image and the test resultant image are identical with each other, and may determine that the cloud streaming server has a failure when the reference image and the test resultant image are not identical.

In the cloud streaming server test method, the test resultant image may be captured at the same time point as the reference image.

Additionally, a test system for a cloud streaming server according to this invention includes the cloud streaming server configured to transmit a test result corresponding to a predetermined test script key input; and a test device configured to compare a reference image corresponding to a normal operation of the cloud streaming server with a test resultant image created by capturing a test resultant video corresponding to the cloud streaming server, and to determine, based on a result of comparison, whether there is a failure in the cloud streaming server.

Also, in order to achieve the above objects, this invention provides a computer program stored in a computer-readable medium for executing the above-discussed cloud streaming server test method.

According to the present invention, it is possible to increase the number of simultaneous service users in a cloud streaming system by preventing a bottleneck caused by excessive data traffic in a cloud streaming service.

Additionally, when providing a cloud streaming service screen to a user's terminal, this invention can deliver data through a more effective use of resources by compressing and offering a changed frame except unchanged frames.

According this invention, it is possible to service more applications without causing a bottleneck or affecting a service quality when providing a cloud streaming service.

Also, this invention can provide a cloud streaming service more effectively by adjusting a service method depending on whether clients' service requests are concentrated or not.

When testing whether a server for providing a cloud streaming service is operating normally or not, this invention uses a virtual client module which is identical in at least some functions with a real client terminal. This invention has an advantage of easily detecting a failure in a cloud streaming server by outputting on a screen a predetermined test result received from the cloud streaming server through the virtual client module, capturing an resultant image outputted from the virtual client module, comparing the captured resultant image with a reference image created when the cloud streaming server operates normally, and based on a comparison result, determining whether the cloud streaming server is operating normally.

Additionally, since it is possible to check whether a server operates normally, there is an effect of preventing in advance an error in data transmission of a cloud streaming server.

Also, by previously detecting a failure of a server for providing a cloud streaming service, this invention has effects of stably providing the cloud streaming service and thereby enhancing a service quality.

Further, by performing a failure test based on a reference image that corresponds to a normal operation of a cloud streaming server, this invention has effects of allowing the test with only a single cloud streaming server and preventing the spread of a test error due to a wrong reference result.

DETAILED DESCRIPTION

Figure 1:
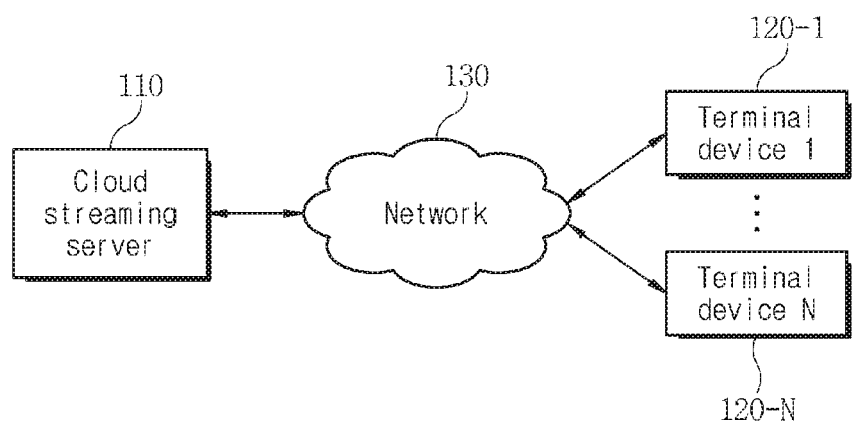
FIG. 1 is a block diagram illustrating a cloud streaming service system according to an embodiment of the present invention.

Now, the present invention will be described in detail with reference to the accompanying drawings. Herein, well known functions and elements may not be described in detail to avoid obscuring the subject matter of this invention. Embodiments of this invention are provided for helping those skilled in the art to completely understand the invention. In the drawings, some elements may be exaggerated in shape and size for a clear illustration.

Hereinafter, preferred embodiments of this invention will be described with reference to the accompanying drawings.

FIG. 1 is a block diagram illustrating a cloud streaming service system according to an embodiment of the present invention.

Referring to FIG. 1, the cloud streaming service system according to an embodiment of this invention includes a cloud streaming server 110, terminal devices 120-1 to 120-N, and a network 130.

The cloud streaming server 110 executes an application in response to a request of one of the terminal devices 120-1 to 120-N and provides a resultant screen of executing the application to one of the terminal devices 120-1 to 120-N. At this time, the cloud streaming server 110 may capture a cloud streaming service screen, namely, an application execution screen.

The cloud streaming server 110 may temporarily store the captured execution screen in a buffer, deliver the screen to an encoder unit, performs encoding, and transmit the encoded screen to the terminal devices 120-1 to 120-N.

The cloud streaming server 110 may determine whether a bottleneck occurs in a buffer. If a bottleneck occurs, the cloud streaming server may compress and store the captured screen in the buffer. The occurrence of a bottleneck may be determined depending on the data storage rate and the data increase amount in the buffer.

For example, the cloud streaming server may set a reference storage rate to 90% of the total data storage capacity of the buffer. If an actual data storage rate of the buffer exceeds 90%, the server may determine that a bottleneck occurs in the buffer, and then may compress the captured screen.

Additionally, the cloud streaming server may calculate a data increase rate by checking the data storage amount of the buffer at regular intervals. If the data increase rate is greater than a predetermined reference increase rate, the server may determine that a bottleneck occurs in the buffer, and then may compress the captured screen.

As discussed above, by preventing in advance a bottleneck that may be caused by simultaneous requests of the terminal devices 120-1 to 120N, the cloud streaming server 110 may provide the cloud streaming service smoothly and also prevent in advance a system error due to the bottleneck.

The terminal devices 120-1 to 120-N receive an application execution resultant screen corresponding to the cloud streaming service from the cloud streaming server 110 and then provide it to users.

The terminal devices 120-1 to 120-N are connected to the communication network and, based on a cloud computing system, can execute an application. The terminal devices may be, but not limited to mobile communication terminals, various devices such as information communication devices, multimedia devices, wired devices, stationary devices, and internet protocol (IP) devices. Also, each of the terminal devices 120-1 to 120-N may be a mobile device, having various mobile communication specifications, such as a mobile phone, a portable multimedia player (PMP), a mobile internet device (MID), a smart phone, a desktop, a tablet PC, a notebook, a net book, a personal digital assistant (PDA), a smart phone, and an information communication device.

The network 130 offers a route of delivering data between the cloud streaming server 110 and the terminal devices 120-1 to 120-N, including a typically used network and any future developable network. For example, the network 130 may be a wired/wireless short-range communication network for providing communication of various information devices within a limited area, a mobile communication network for providing communication between mobile entities and between a mobile entity and any other entity outside the mobile entity, a satellite communications network for providing communication between earth stations using satellites, one of wired/wireless communication networks, or any combination thereof. Meanwhile, the standard of transmission scheme for the network 130 is not limited to the existing transmission scheme standard, and may include all transmission scheme standards to be developed in the future. Also, the network used between the cloud streaming server 110 and the terminal devices 120-1 to 120-N in FIG. 1 may be different from or identical with a network between the terminal devices 120-1 to 120-N.

Figure 2:
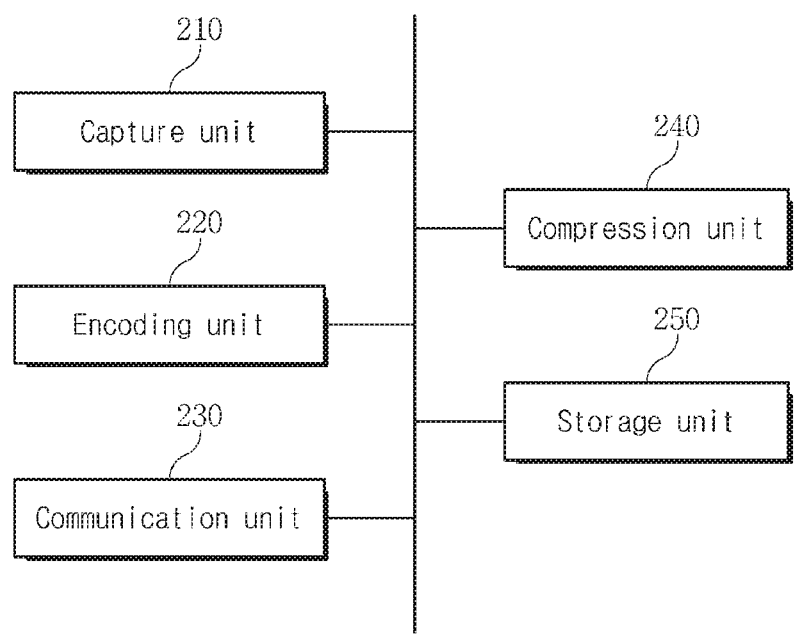
FIG. 2 is a block diagram illustrating an example of a cloud streaming server shown in FIG. 1.

FIG. 2 is a block diagram illustrating an example of a cloud streaming server shown in FIG. 1.

Referring to FIG. 2, the cloud streaming server shown in FIG. 2 includes a capture unit 210, an encoding unit 220, a communication unit 230, a compression unit 240, and a storage unit 250.

The capture unit 210 captures a cloud streaming service screen. For example, if an application execution request is received from one or more terminal devices that access the cloud streaming server 110 through the network, the cloud streaming server 110 may execute an application in response to the request and then provide an execution resultant screen corresponding to a result of executing the application to the one or more terminal devices.

The encoding unit 220 loads a cloud streaming service screen from the buffer that stores the captured cloud streaming service screen, and then encodes the loaded screen. For example, the application execution resultant screen captured in response to an application execution request of one or more terminal devices may be stored in the buffer for processing data between the capture unit 210 and the encoding unit 220. Therefore, the encoding unit 220 may load and encode the application execution resultant screen stored in the buffer, and deliver the encoded application execution resultant screen to one or more terminal devices.

At this time, if the cloud streaming service screen loaded from the buffer is in a compressed state, the encoding unit may decompress the loaded screen and then encode the decompressed screen. For example, when loading the cloud streaming service screen from the buffer, the encoding unit 220 may check whether the cloud streaming service screen in a compressed state. In case of a compressed state, the encoding unit may perform decompression and encoding.

The communication unit 230 transmits the encoded cloud streaming service screen to the terminal device. Also, the communication unit 230 performs a function of transmitting or receiving related information to or from a plurality of terminal devices through the communication network such as the network shown in FIG. 1. Particularly, the communication unit 230 according to an embodiment of this invention receives, from the terminal device, a request for the cloud streaming service and then provides, to the terminal device, an application execution resultant screen corresponding to the cloud streaming service requested by the terminal device.

The compression unit 240 determines whether a bottleneck occurs in the buffer, and depending on a determination result, compresses the cloud streaming service screen.

In this case, the occurrence or not of a bottleneck may be determined, based on a data storage rate of the buffer.

In this case, if the data storage rate of the buffer exceeds a predetermined reference storage rate, the compression unit may determine that a bottleneck occurs. For example, if the reference storage rate is set to 90% of the total data storage capacity of the buffer, and if the data storage rate of the buffer exceeds 90%, it may be determined that a bottleneck occurs in the buffer.

Also, the occurrence or not of a bottleneck may be determined, based on a data increase rate of the buffer.

In this case, the data increase rate may be calculated at regular intervals. If the data increase rate is greater than a predetermined reference increase rate, it may be determined that a bottleneck occurs in the buffer. For example, the data increase rate may be calculated by checking every minute the amount of data stored in the buffer. If the data increase rate exceeds a predetermined increase rate, it may be determined that a bottleneck occurs in the buffer.

In this case, the compression unit may select one or more identical frames, which are identical with previous frames, from among frames corresponding to the cloud streaming service screen, and then convert the one or more identical frames into a flag for indicating that the one or more identical frames are identical with the previous frames. For example, let's suppose that the first and seventh frames only, among ten frames, are changed in comparison with the previous frames and that the remaining eight frames are unchanged. In this case, real data may be delivered as to the first and seventh frames only. Together with such real data, a flag indicating that the second to sixth frames are identical with the first frame and a flag indicating that the eighth to tenth frames are identical with the seventh frame may be delivered.

In this case, the format of image data corresponding to the cloud streaming service screen may be encoded into a format to reduce capacity. Since the image-based cloud streaming service has a lower compression rate than the video-based cloud streaming service, there is a strong possibility that a transmission delay will occur. Also, depending on the type of a still image codec for compressing each frame, the amount of delivered data and the load of the cloud streaming server may be varied. For example, a palette-based PNG encoding may reduce a data size cause even though sometimes causing a degradation of an image quality. Therefore, this may be helpful to prevent the occurrence of a bottleneck in the buffer.

The storage unit 250 stores various kinds of the above-discussed information created in a cloud streaming service process according to an embodiment of this invention.

According to an embodiment, the storage unit 250 may be formed independently from the cloud streaming service 110 and support a function for the cloud streaming service. In this case, the storage unit 250 may operate as separate high-capacity storage and include a control function for the operation.

In addition, the above-discussed cloud streaming server 110 may be also implemented by means of one or more servers.

Meanwhile, the cloud streaming server 110 has a memory that may store information. In an embodiment, the memory is a computer-readable medium. The memory may be a volatile memory unit in one embodiment and a nonvolatile memory unit in another embodiment. In an embodiment, the storage unit is a computer-readable medium. In various different embodiments, the storage unit may include a hard disk device, an optical disk device, or any other high-capacity storage device.

Figure 3:
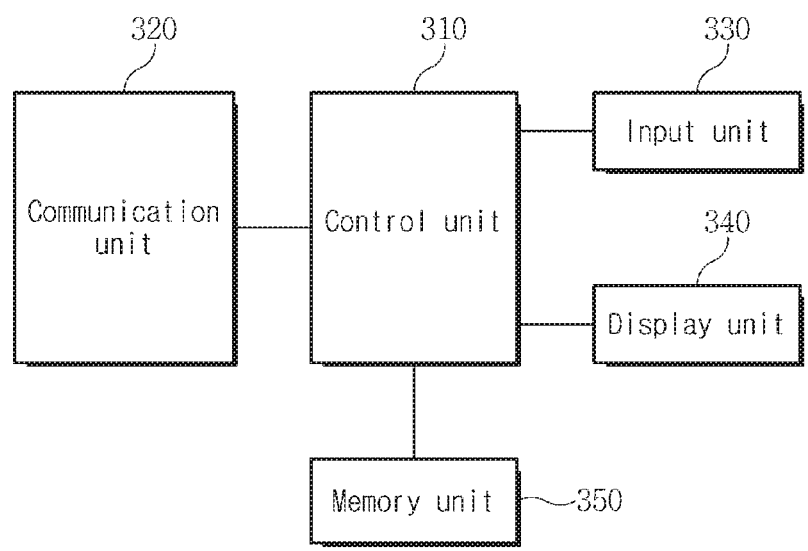
FIG. 3 is a block diagram illustrating an example of a terminal device shown in FIG. 1.

FIG. 3 is a block diagram illustrating an example of a terminal device shown in FIG. 1.

Referring to FIG. 3, the terminal device includes a control unit 310, a communication unit 320, an input unit 330, a display unit 340, and a memory unit 350.

The input unit 330 receives an input as to various kinds of numeric and literal information and delivers an input signal associated with setting or controlling various functions of the terminal device to the control unit 310. Also, the input unit 330 may include at least one of a key pad and a touch pad for creating an input signal in response to a user's touch or manipulation. In this case, the input unit 330 may be integrated with the display unit 340 to form a single touch panel (or a touch screen), thus performing both an input function and a display function. In addition, the input unit 330 may use a typical input device such as a keyboard, a keypad, a mouse and a joystick, and any kind of input mechanisms to be developed. Particularly, the input unit 330 according to this invention may deliver, to the control unit 310, an input signal for requesting the cloud streaming service from the cloud streaming server 110 or receiving an application execution resultant screen from the cloud streaming server 110.

The display unit 340 displays information about operating status and result of the terminal device. Also, the display unit 340 may display a menu of the terminal device and user data entered by a user. The display unit 340 may be formed of LCD (Liquid Crystal Display), TFT-LCD (Thin Film Transistor LCD), LED (Light Emitting Diode), OLED (Organic LED), AMOLED (Active Matrix OLED), retina display, flexible display, 3-dimensional display, or the like. In case the display unit 340 is formed of a touch screen, the display unit 340 may perform all or parts of functions of the input unit 330. Particularly, the display unit 340 according to this invention displays information associated with the cloud streaming service on a screen.

The memory unit 350, a device for storing data, includes a main memory unit and an auxiliary memory unit, and stores a program required for the operation of the terminal device. The memory unit 350 may include mainly a program region and a data region. When any function is activated in response to a user's request, the terminal device executes a relevant application and offers a corresponding function under the control of the control unit 310. Particularly, the memory unit 350 according to this invention stores an operation system for booting the terminal device, a program for requesting the cloud streaming service from the cloud streaming server 110 or receiving an application execution result from the cloud streaming server 110, and the like.

The communication unit 320 performs a function for transmitting or receiving data to or from the cloud streaming server 110 through the network. Here, the communication unit 320 may include an RF transmitter which up-converts the frequency of an outgoing signal and then amplifies the signal, an RF receiver which amplifies with low-noise an incoming signal and down-converts the frequency of the signal, and the like. The communication unit 320 may include at least one of a wireless communication module (not shown) and a wired communication module (not shown). The wireless communication module is configured for transmission and reception of data in accordance with a wireless communication scheme. In case of using wireless communication, the terminal device may transmit or receive data to or from the cloud streaming server 110 through one of a wireless network communication module, a WLAN communication module, and a WPAN communication module. Additionally, the wired communication module is configured for transmission and reception of data in a wired manner. The wired communication module may by access the communication network through a cable and then transmit or receive data to or from the cloud streaming server 110. Particularly, by communicating with the cloud streaming server 110, the communication unit 320 according to this invention transmits or receives data required for a request for the execution of an application and the reception of an application execution resultant screen.

The control unit 310 may be a processor for operating an OS (Operation System) and respective elements. The control unit 310 may control the whole process of accessing the cloud streaming server 110. For example, in case of accessing the cloud streaming server 110 through a separate service application, the control unit may control the whole process of executing the service application in response to a user's request, control a service request to be transmitted to the cloud streaming server 110 simultaneously with the execution, and also control terminal information for user authentication to be transmitted together.

Figure 4:
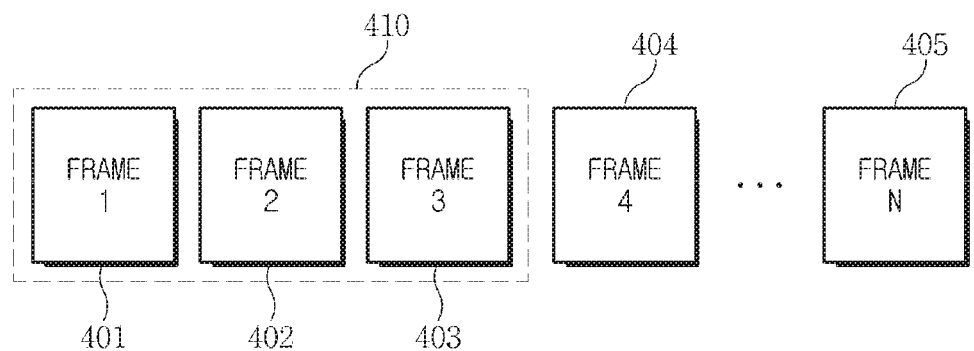
FIG. 4 is a diagram illustrating a data compression method according to an embodiment of the present invention.

FIG. 4 is a diagram illustrating a data compression method according to an embodiment of the present invention.

Referring to FIG. 4, the data compression method according to an embodiment of this invention may compare the first to N-th frames 401 to 405, corresponding to the cloud streaming service screen, with previous frames, select the identical frames 410, and convert the selected frames into a flag. For example, if frames 401 to 403 in FIG. 4 are the identical frames 410, real data may be sent as to the frame 401 only. As to other frames 402 and 403, a flag which indicates that such frames are identical with the frame 401 may be created and used for compression. Also, since the frame 404 is a changed frame which does not belong to the identical frames, real data of the frame 404 may be sent to the encoder unit.

Therefore, if it is expected that a bottleneck will occur in the buffer, the captured cloud streaming service screen may be compressed in accordance with the above-discussed method. This may prevent in advance an error of the cloud streaming service due to a bottleneck.

Figure 5:
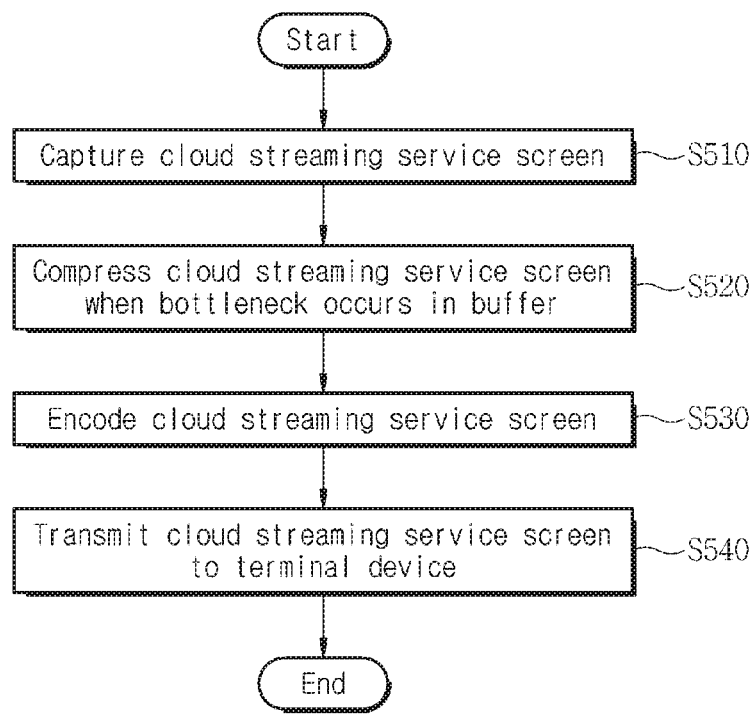
FIG. 5 is a flow diagram illustrating a data compression method in a cloud streaming service according to an embodiment of the present invention.

FIG. 5 is a flow diagram illustrating a data compression method in a cloud streaming service according to an embodiment of the present invention.

Referring to FIG. 5, the data compression method in the cloud streaming service according to an embodiment of this invention captures a cloud streaming service screen (S510). For example, if an application execution request is received from one or more terminal devices that access the cloud streaming server through the network, the cloud streaming server may execute an application in response to the request and then provide an execution resultant screen corresponding to a result of executing the application to the one or more terminal devices.

Additionally, the data compression method in the cloud streaming service according to an embodiment of this invention determines whether a bottleneck occurs in the buffer that temporarily stores the captured cloud streaming service screen, and then depending on a determination result, compresses the cloud streaming service screen (S520).

In this case, the occurrence or not of a bottleneck may be determined, based on a data storage rate of the buffer.

In this case, if the data storage rate of the buffer exceeds a predetermined reference storage rate, it may be determined that a bottleneck occurs. For example, if the reference storage rate is set to 90% of the total data storage capacity of the buffer, and if the data storage rate of the buffer exceeds 90%, it may be determined that a bottleneck occurs in the buffer.

Also, the occurrence or not of a bottleneck may be determined, based on a data increase rate of the buffer.

In this case, the data increase rate may be calculated at regular intervals. If the data increase rate is greater than a predetermined reference increase rate, it may be determined that a bottleneck occurs in the buffer. For example, the data increase rate may be calculated by checking every minute the amount of data stored in the buffer. If the data increase rate exceeds a predetermined increase rate, it may be determined that a bottleneck occurs in the buffer.

In this case, one or more identical frames which are identical with previous frames may be selected from among frames corresponding to the cloud streaming service screen, and the identical frames may be converted into a flag which indicates that the identical frames are identical with the previous frames. For example, let's suppose that the first and seventh frames only, among ten frames, are changed in comparison with the previous frames and that the remaining eight frames are unchanged. In this case, real data may be delivered as to the first and seventh frames only. Together with such real data, a flag indicating that the second to sixth frames are identical with the first frame and a flag indicating that the eighth to tenth frames are identical with the seventh frame may be delivered.

In this case, the format of image data corresponding to the cloud streaming service screen may be encoded into a format to reduce capacity. Since the image-based cloud streaming service has a lower compression rate than the video-based cloud streaming service, there is a strong possibility that a transmission delay will occur. Also, depending on the type of a still image codec for compressing each frame, the amount of delivered data and the load of the cloud streaming server may be varied. For example, a palette-based PNG encoding may reduce a data size cause even though sometimes causing a degradation of an image quality. Therefore, this may be helpful to prevent the occurrence of a bottleneck in the buffer.

Additionally, the data compression method in the cloud streaming service according to an embodiment of this invention loads the compressed cloud streaming service screen from the buffer and then encodes the loaded screen (S530). For example, the application execution resultant screen captured in response to an application execution request of one or more terminal devices may be stored in the buffer for processing data between the capture unit and the encoding unit. Therefore, the encoding unit may load and encode the application execution resultant screen stored in the buffer, and deliver the encoded application execution resultant screen to one or more terminal devices.

At this time, if the cloud streaming service screen loaded from the buffer is in a compressed state, the loaded screen may be decompressed and then encoded. For example, when loading the cloud streaming service screen from the buffer, the encoding unit may check whether the cloud streaming service screen in a compressed state. In case of a compressed state, the encoding unit may perform decompression and encoding.

Additionally, the data compression method in the cloud streaming service according to an embodiment of this invention transmits the encoded cloud streaming service screen to the terminal device (S540). At this time, related information may be transmitted or received to or from a plurality of terminal devices through the communication network such as the network.

Figure 6:
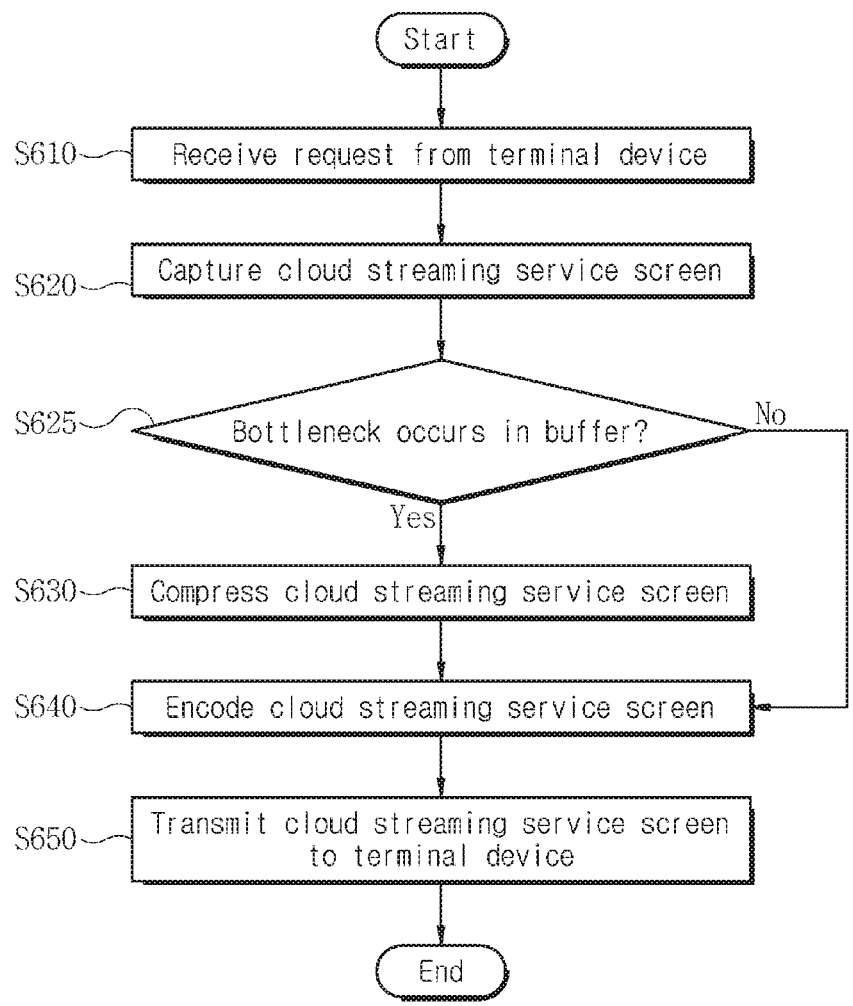
FIG. 6 is a flow diagram illustrating a cloud streaming service process according to an embodiment of the present invention.

FIG. 6 is a flow diagram illustrating a cloud streaming service process according to an embodiment of the present invention.

Referring to FIG. 6, the cloud streaming service process according to an embodiment of this invention receives a request corresponding to the cloud streaming service from one or more terminal devices (S610).

The cloud streaming server captures a cloud streaming service screen corresponding to the request of the one or more terminal devices (S620). In response to the request, the cloud streaming server may execute an application and then capture an application execution resultant screen corresponding to a result of executing the application.

While the cloud streaming service screen is delivered from the capture unit to the encoding unit, the cloud streaming server determines whether a bottleneck occurs in the buffer that temporarily stores the cloud streaming service screen (S625).

At this time, the occurrence or not of a bottleneck may be determined in accordance with a data storage rate and a data increase amount of the buffer.

For example, if a reference storage rate is set to 90% of the total data storage capacity of the buffer, and if actually the data storage rate of the buffer exceeds 90%, the occurrence of a bottleneck in the buffer may be estimated and then the captured screen may be compressed.

Also, by checking the amount of data stored in the buffer at regular intervals, a data increase rate may be calculated. If the data increase rate of the buffer is greater than a predetermined reference increase rate, the occurrence of a bottleneck in the buffer may be estimated and then the captured screen may be compressed.

If any bottleneck occurs in the buffer as a result of determination at step 625, the server compresses the cloud streaming service screen (S630).

At this time, the server may select one or more identical frames, which are identical with previous frames, from among frames corresponding to the cloud streaming service screen, and then convert the one or more identical frames into a flag for indicating that the one or more identical frames are identical with the previous frames.

At this time, the format of image data corresponding to the cloud streaming service screen may be encoded into a format to reduce capacity.

If no bottleneck occurs in the buffer as a result of determination at step 625, the encoder loads the cloud streaming service screen stored in the buffer and then encodes the loaded screen. Also, the encoder may load the cloud streaming service screen, compressed due to the occurrence of a bottleneck, from the buffer and then encode the loaded screen.

The cloud streaming server transmits the encoded cloud streaming service screen to the terminal device (S650).

Figure 7:
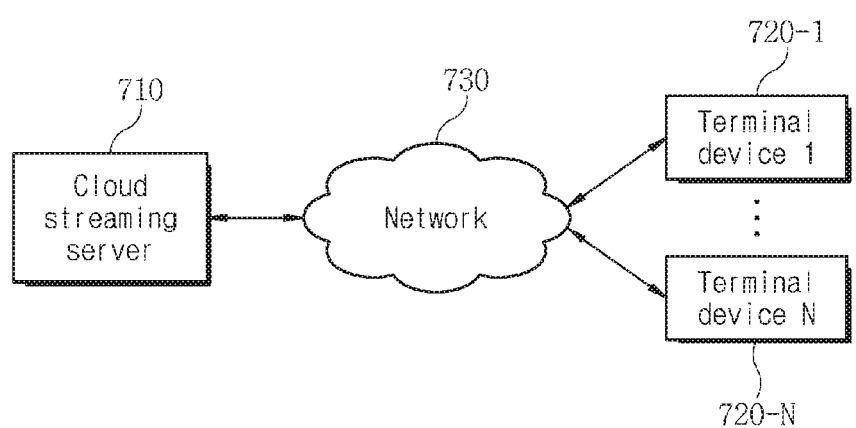
FIG. 7 is a block diagram illustrating a cloud streaming service system according to an embodiment of the present invention.

FIG. 7 is a block diagram illustrating a cloud streaming service system according to an embodiment of the present invention.

Referring to FIG. 7, the cloud streaming service system according to an embodiment of this invention includes a cloud streaming server 710, terminal devices 720-1 to 720-N, and a network 730.

The cloud streaming server 710 receives a service request from users' terminal devices 720-1 to 720-N. Since a larger storage space and higher processing capability are required to run an application, the terminal devices 720-1 to 720-N may request a service for executing an application from the cloud streaming server 710 so as to be provided with a compressed screen of the application running at the cloud streaming server 710.

Additionally, the cloud streaming server 710 identifies the type of the cloud streaming service corresponding to the service request. At this time, the server may detect an OPEN command for setting an audio device in the cloud streaming service and then check whether the type of the cloud streaming service is a video. If the OPEN command is detected, the server may determine that a video is being played and that the type of the cloud streaming service is a video. In this case, the server may ignore the OPEN command detected when no service request is received at the beginning of the execution of an application corresponding to the service request, and identify the type of the cloud streaming service as a video when the OPEN command is detected after the service request is received. Also, in case a Sound Open function is detected when an application corresponding to the service request is captured, the server may identify the type of the cloud streaming service as a video.

Additionally, the cloud streaming server 710 assigns a priority to the cloud streaming service, based on the type of the cloud streaming service. At this time, the server may assign a lower priority to the cloud streaming service having the type of a video than the cloud streaming service having a certain type other than a video.

Additionally, the cloud streaming server 710 determines whether a streaming pipeline capable of simultaneously processing in parallel the cloud streaming service reaches the limit of simultaneous service processing, and then, based on a result of determination, provides the cloud streaming service according to priority. If the streaming pipeline does not reach the simultaneous service processing limit, the server may provide the cloud streaming service to the terminal device regardless of priority as soon as the service is requested. Also, if the number of cloud streaming services simultaneously processed in the streaming pipeline is equal to or greater than the predetermined number of simultaneous processing, the server may determine that the streaming pipeline reaches the simultaneous service processing limit. Here, the predetermined number of simultaneous processing may be smaller than the maximum number of cloud streaming services which are simultaneously processable in the streaming pipeline.

The terminal devices 720-1 to 720-N receive an application execution resultant screen corresponding to the cloud streaming service from the cloud streaming server 710 and then provide it to users.

The terminal devices 720-1 to 720-N are connected to the communication network and, based on a cloud computing system, can execute an application. The terminal devices may be, but not limited to mobile communication terminals, various devices such as information communication devices, multimedia devices, wired devices, stationary devices, and internet protocol (IP) devices. Also, each of the terminal devices 720-1 to 720-N may be a mobile device, having various mobile communication specifications, such as a mobile phone, a portable multimedia player (PMP), a mobile internet device (MID), a smart phone, a desktop, a tablet PC, a notebook, a net book, a personal digital assistant (PDA), a smart phone, and an information communication device.

The network 730 offers a route of delivering data between the cloud streaming server 710 and the terminal devices 720-1 to 720-N, including a typically used network and any future developable network. For example, the network 730 may be a wired/wireless short-range communication network for providing communication of various information devices within a limited area, a mobile communication network for providing communication between mobile entities and between a mobile entity and any other entity outside the mobile entity, a satellite communications network for providing communication between earth stations using satellites, one of wired/wireless communication networks, or any combination thereof. Meanwhile, the standard of transmission scheme for the network 730 is not limited to the existing transmission scheme standard, and may include all transmission scheme standards to be developed in the future. Also, the network used between the cloud streaming server 710 and the terminal devices 720-1 to 720-N in FIG. 7 may be different from or identical with a network between the terminal devices 720-1 to 720-N.

Figure 8:
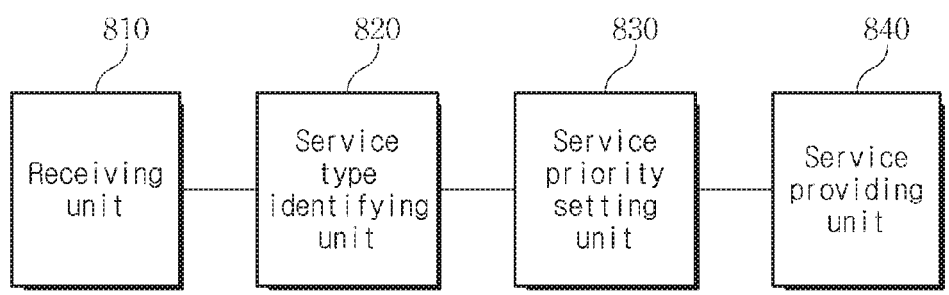
FIG. 8 is a block diagram illustrating an example of a cloud streaming server shown in FIG. 7.

FIG. 8 is a block diagram illustrating an example of a cloud streaming server shown in FIG. 7.

Referring to FIG. 8, the cloud streaming server 710 shown in FIG. 7 includes a receiving unit 810, a service type identifying unit 820, a service priority setting unit 830, and a service providing unit 840.

The receiving unit 810 receives a service request from a user's terminal device. The terminal device may require a larger storage space and higher processing capability so as to run an application. Therefore, the terminal device may request a service for executing an application from the cloud streaming server 710 so as to be provided with a compressed screen of the application running at the cloud streaming server 710.

The service type identifying unit 820 identifies the type of a cloud streaming service corresponding to the service request. Among services requested from the cloud streaming server 710, there may be a service which should be provided immediately in response to a service request, or a service which does not need to react immediately. For example, in case of a game, a service has to be provided as soon as a service request is received from a user. On the contrary, in case a video is played on YouTube, a processing order of the service may be delayed if setting FPS (frame per second) can be adjusted. Therefore, by scheduling the processing order of cloud streaming services depending on the service type, the cloud streaming server may be operated more smoothly.

In this case, by detecting an OPEN command for setting an audio device in the cloud streaming service, the service type identifying unit may identify whether the type of a cloud streaming service is a video. A video may contain an audio part together with a video part, and it is required to set a device supporting audio so as to support the audio in the video. Therefore, using commands such as OPEN and CLOSE, a device that supports audio may be set. For example, by calling and setting an MCI (Media Control Interface) device for supporting audio/video playback through the OPEN command and terminating the setting of the MCI device through the CLOSE command, a video file corresponding to the setting of the MCI device may be played. Therefore, through the detection of the OPEN command for setting an audio device, it is possible to identify whether the type of the corresponding cloud streaming service is a video.

If the OPEN command is detected, the service type identifying unit may determine that a video is played, and then identify the type of the cloud streaming service as a video. For example, if the OPEN command for setting the audio device is detected in a specific cloud streaming service, the type of the specific cloud streaming service may be determined as a video file that contains audio.

In this case, an OPEN command detected when no service request is received at the beginning of the execution of an application corresponding to the service request may be ignored. If any OPEN command is detected after the service request is received, the type of the cloud streaming service may be identified as a video. For example, even when the type of a cloud streaming service is a game, the OPEN command for setting the audio device may be detected at the beginning of the execution of the application. This detection method according to this invention may be used for identifying the type of a cloud streaming service as a video only as to the OPEN command detected after the service request is received from a user. Therefore, any OPEN command detected in a state where a service request is not received from a user at the beginning of the execution of an application may be ignored.

Also, even in case the type of a cloud streaming service is a game, the OPEN command for supporting the audio device may be detected after executing an application and then receiving a service request from a user. In this case, as to this service request, the type of the cloud streaming service may be identified as a video.

In this case, if a Sound Open function is detected when an application corresponding to the service request is captured, the type of the cloud streaming service may be identified as a video. For example, it may be detected whether a video is played since an application provided through the cloud streaming service is not designed for the cloud streaming. In this case, after a user's click event for a service request occurs at the terminal device, it may be detected whether the Sound Open function exists when the cloud streaming server 710 captures the application. If the Sound Open function is detected, the type of the cloud streaming service may be identified as a video.

The service priority setting unit 830 assigns a priority to the cloud streaming service, based on the type of the cloud streaming service. As discussed above, among services requested from the cloud streaming server 710, there may be a service such as a game which should immediately react to a service request, or a service such as a video which may delay processing until an actual service is provided even though a service request is received. Therefore, depending on the type of service, a higher priority is assigned to a cloud streaming service that needs to be processed immediately, and a lower priority is assigned to a cloud streaming service that does not need to be processed immediately. By scheduling a streaming pipeline in this manner, a more smooth cloud streaming service may be provided.

In this case, a lower priority may be assigned to a cloud streaming service having a video type in comparison with a cloud streaming service having any other type. For example, a cloud streaming service such as a game may have a higher priority and thus be provided to a user more rapidly.

The service providing unit 840 determines whether a streaming pipeline capable of simultaneously processing in parallel the cloud streaming service reaches the limit of simultaneous service processing, and then, based on a result of determination, provides the cloud streaming service according to priority.

The pipeline is a data processing process capable of optimally using the central processing unit of a computer, and is designed to divide a single processor into several sub-processors which have different functions and simultaneously process different data. For example, computer instructions typically go through four stages of fetching, analyzing, content fetching, and executing. Without the pipelined approach, the computer processor should process the instructions one by one in the order of input. However, the pipeline approach allows parallel processing of instructions, thus increasing a processing speed. Therefore, by applying the pipeline to the cloud streaming server 710 and processing the cloud streaming service step by step in parallel, a service speed of the cloud streaming server 710 can be improved.

Such a streaming pipeline has a limit in simultaneously processing a service. If service processing is performed to exceed this limit, a bottleneck may occur in which the performance of the corresponding processing section is degraded or paralyzed. A bottleneck may cause a reduction in efficiency of the overall system. Therefore, if the streaming pipeline is expected to reach the limit of simultaneous service processing, the server may prevent a bottleneck by reducing the number of cloud streaming services to be processed. At this time, the number of cloud streaming services to be immediately processed may be reduced using priority assigned to the service.

If the streaming pipeline does not reach the limit of simultaneous service processing, the server may provide the cloud streaming service to the terminal device regardless of priority as soon as the service is requested. Even though the priority of the cloud streaming service requested by a user is low, the service may be processed and provided immediately according to priority if the streaming pipeline has capacity for processing the service.

If the number of cloud streaming services simultaneously processed in the streaming pipeline is equal to or greater than the predetermined number of simultaneous processing, it may be determined that the streaming pipeline reaches the simultaneous service processing limit.

In this case, the predetermined number of simultaneous processing may be smaller than the maximum number of cloud streaming services which are simultaneously processable in the streaming pipeline. For example, if a reference value for estimating the limit of the streaming pipeline is set to the maximum number of cloud streaming services simultaneously processable in the streaming pipeline, a bottleneck may occur simultaneously with estimation. Therefore, in order to prevent a bottleneck from occurring simultaneously with estimation, the predetermined number of simultaneous processing which is a reference value for estimating a bottleneck may be set to be smaller than the maximum number of cloud streaming services simultaneously processable in the streaming pipeline. Meanwhile, the predetermined number of simultaneous processing may be freely set by an administrator of the cloud streaming server 710.

Figure 9:
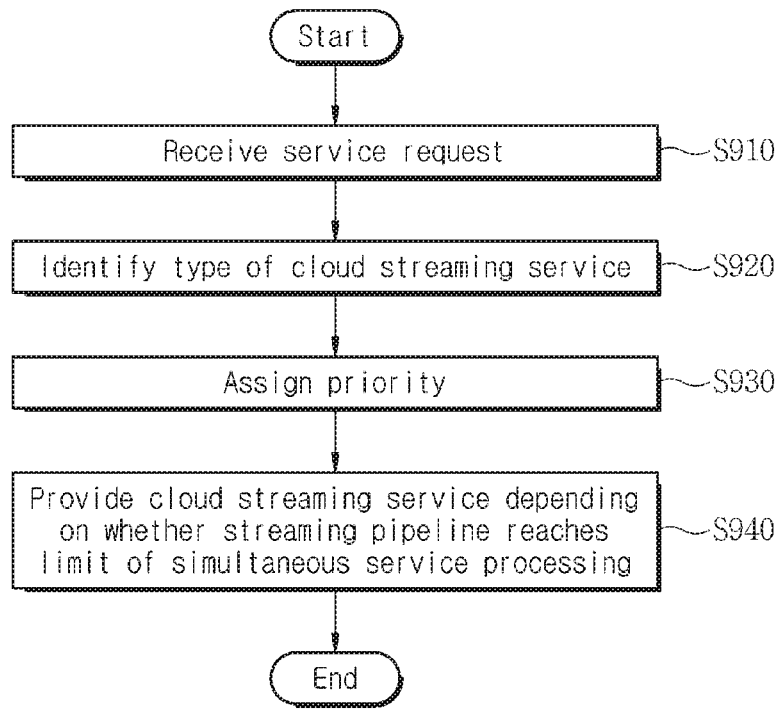
FIG. 9 is a flow diagram illustrating a service processing method depending on a cloud streaming service type according to an embodiment of the present invention.

FIG. 9 is a flow diagram illustrating a service processing method depending on a cloud streaming service type according to an embodiment of the present invention.

Referring to FIG. 9, the service processing method depending on the cloud streaming service type in an embodiment of this invention receives a service request from a user's terminal device (S910). The terminal device may require a larger storage space and higher processing capability so as to run an application. Therefore, the terminal device may request a service for executing an application from the cloud streaming server so as to be provided with a compressed screen of the application running at the cloud streaming server.

Also, the service processing method depending on the cloud streaming service type in an embodiment of this invention identifies the type of a cloud streaming service corresponding to the service request (S920). Among services requested from the cloud streaming server, there may be a service which should be provided immediately in response to a service request, or a service which does not need to react immediately. For example, in case of a game, a service has to be provided as soon as a service request is received from a user. On the contrary, in case a video is played on YouTube, a processing order of the service may be delayed if setting FPS (frame per second) can be adjusted. Therefore, by scheduling the processing order of cloud streaming services depending on the service type, the cloud streaming server may be operated more smoothly.

In this case, by detecting an OPEN command for setting an audio device in the cloud streaming service, the service type identifying unit may identify whether the type of a cloud streaming service is a video. A video may contain an audio part together with a video part, and it is required to set a device supporting audio so as to support the audio in the video. Therefore, using commands such as OPEN and CLOSE, a device that supports audio may be set. For example, by calling and setting an MCI (Media Control Interface) device for supporting audio/video playback through the OPEN command and terminating the setting of the MCI device through the CLOSE command, a video file corresponding to the setting of the MCI device may be played. Therefore, through the detection of the OPEN command for setting an audio device, it is possible to identify whether the type of the corresponding cloud streaming service is a video.

If the OPEN command is detected, the service type identifying unit may determine that a video is played, and then identify the type of the cloud streaming service as a video. For example, if the OPEN command for setting the audio device is detected in a specific cloud streaming service, the type of the specific cloud streaming service may be determined as a video file that contains audio.

In this case, an OPEN command detected when no service request is received at the beginning of the execution of an application corresponding to the service request may be ignored. If any OPEN command is detected after the service request is received, the type of the cloud streaming service may be identified as a video. For example, even when the type of a cloud streaming service is a game, the OPEN command for setting the audio device may be detected at the beginning of the execution of the application. This detection method according to this invention may be used for identifying the type of a cloud streaming service as a video only as to the OPEN command detected after the service request is received from a user. Therefore, any OPEN command detected in a state where a service request is not received from a user at the beginning of the execution of an application may be ignored.

Also, even in case the type of a cloud streaming service is a game, the OPEN command for supporting the audio device may be detected after executing an application and then receiving a service request from a user. In this case, as to this service request, the type of the cloud streaming service may be identified as a video.

In this case, if a Sound Open function is detected when an application corresponding to the service request is captured, the type of the cloud streaming service may be identified as a video. For example, it may be detected whether a video is played since an application provided through the cloud streaming service is not designed for the cloud streaming. In this case, after a user's click event for a service request occurs at the terminal device, it may be detected whether the Sound Open function exists when the cloud streaming server captures the application. If the Sound Open function is detected, the type of the cloud streaming service may be identified as a video.

Also, the service processing method depending on the cloud streaming service type in an embodiment of this invention assigns a priority to the cloud streaming service, based on the type of the cloud streaming service (S930). As discussed above, among services requested from the cloud streaming server, there may be a service such as a game which should immediately react to a service request, or a service such as a video which may delay processing until an actual service is provided even though a service request is received. Therefore, depending on the type of service, a higher priority is assigned to a cloud streaming service that needs to be processed immediately, and a lower priority is assigned to a cloud streaming service that does not need to be processed immediately. By scheduling a streaming pipeline in this manner, a more smooth cloud streaming service may be provided.

In this case, a lower priority may be assigned to a cloud streaming service having a video type in comparison with a cloud streaming service having any other type. For example, a cloud streaming service such as a game may have a higher priority and thus be provided to a user more rapidly.

Also, the service processing method depending on the cloud streaming service type in an embodiment of this invention determines whether a streaming pipeline capable of simultaneously processing in parallel the cloud streaming service reaches the limit of simultaneous service processing, and then, based on a result of determination, provides the cloud streaming service according to priority (S940).

The pipeline is a data processing process capable of optimally using the central processing unit of a computer, and is designed to divide a single processor into several sub-processors which have different functions and simultaneously process different data. For example, computer instructions typically go through four stages of fetching, analyzing, content fetching, and executing. Without the pipelined approach, the computer processor should process the instructions one by one in the order of input. However, the pipeline approach allows parallel processing of instructions, thus increasing a processing speed. Therefore, by applying the pipeline to the cloud streaming server and processing the cloud streaming service step by step in parallel, a service speed of the cloud streaming server can be improved.

Such a streaming pipeline has a limit in simultaneously processing a service. If service processing is performed to exceed this limit, a bottleneck may occur in which the performance of the corresponding processing section is degraded or paralyzed. A bottleneck may cause a reduction in efficiency of the overall system. Therefore, if the streaming pipeline is expected to reach the limit of simultaneous service processing, the server may prevent a bottleneck by reducing the number of cloud streaming services to be processed. At this time, the number of cloud streaming services to be immediately processed may be reduced using priority assigned to the service.

If the streaming pipeline does not reach the limit of simultaneous service processing, the server may provide the cloud streaming service to the terminal device regardless of priority as soon as the service is requested. Even though the priority of the cloud streaming service requested by a user is low, the service may be processed and provided immediately according to priority if the streaming pipeline has capacity for processing the service.

If the number of cloud streaming services simultaneously processed in the streaming pipeline is equal to or greater than the predetermined number of simultaneous processing, it may be determined that the streaming pipeline reaches the simultaneous service processing limit.

In this case, the predetermined number of simultaneous processing may be smaller than the maximum number of cloud streaming services which are simultaneously processable in the streaming pipeline. For example, if a reference value for estimating the limit of the streaming pipeline is set to the maximum number of cloud streaming services simultaneously processable in the streaming pipeline, a bottleneck may occur simultaneously with estimation. Therefore, in order to prevent a bottleneck from occurring simultaneously with estimation, the predetermined number of simultaneous processing which is a reference value for estimating a bottleneck may be set to be smaller than the maximum number of cloud streaming services simultaneously processable in the streaming pipeline. Meanwhile, the predetermined number of simultaneous processing may be freely set by an administrator of the cloud streaming server.

Figure 10:
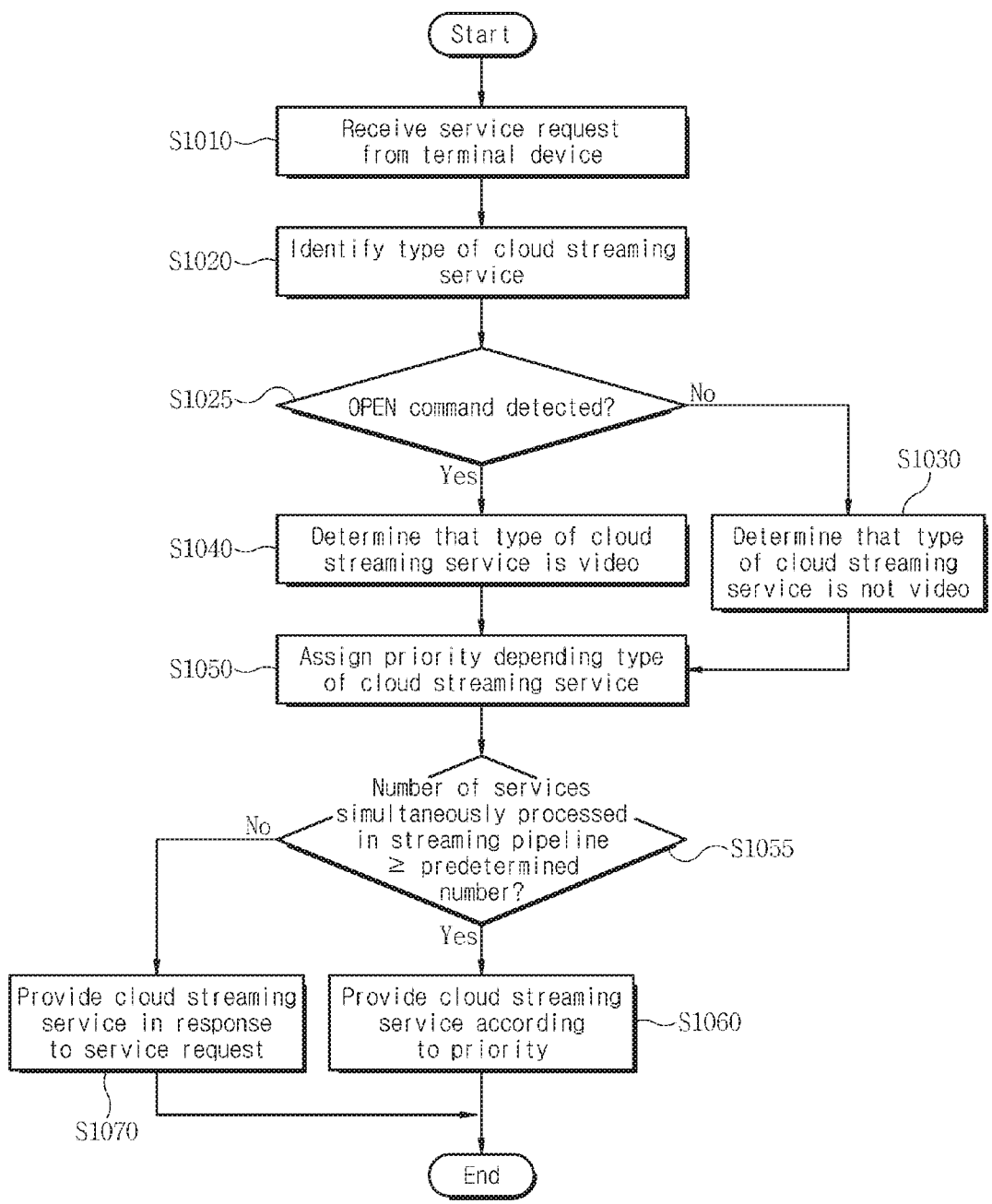
FIG. 10 is a detailed flow diagram illustrating a service processing method depending on a cloud streaming service type according to an embodiment of the present invention.

FIG. 10 is a detailed flow diagram illustrating a service processing method depending on a cloud streaming service type according to an embodiment of the present invention.

Referring to FIG. 10, in the service processing method depending on the cloud streaming service type according to an embodiment of this invention, the cloud streaming server receives a service request from a user's terminal device (S1010).

Then the cloud streaming server identifies the type of a cloud streaming service corresponding to the user's service request (S1020).

In order to identify whether the cloud streaming service corresponding to the user's service request is a video, the cloud streaming server determines whether an OPEN command for setting an audio device is detected (S1025).

If it is determined at step S1025 that no OPEN command is detected, the server determines that the type of the cloud streaming service is not a video (S1030).

If it is determined at step S1025 that the OPEN command is detected, the server determines that the type of the cloud streaming service is a video (S1040).

Thereafter, the cloud streaming server assigns a priority, depending on the identified type of the cloud streaming service (S1050).

Also, the cloud streaming server determines whether the number of cloud streaming services simultaneously processed in the streaming pipeline is equal to or greater than a predetermined number of simultaneous processing (S1055).

If it is determined at step S1055 that the number of cloud streaming services simultaneously processed in the streaming pipeline is equal to or greater than the predetermined number of simultaneous processing, the server processes the cloud streaming service according to the priority assigned thereto and then provides the service to a user (S1060).

If it is determined at step S1055 that the number of cloud streaming services simultaneously processed in the streaming pipeline is smaller than the predetermined number of simultaneous processing, the server processes and provides the cloud streaming service as soon as the service request is received from a user (S1070).

Figure 11:
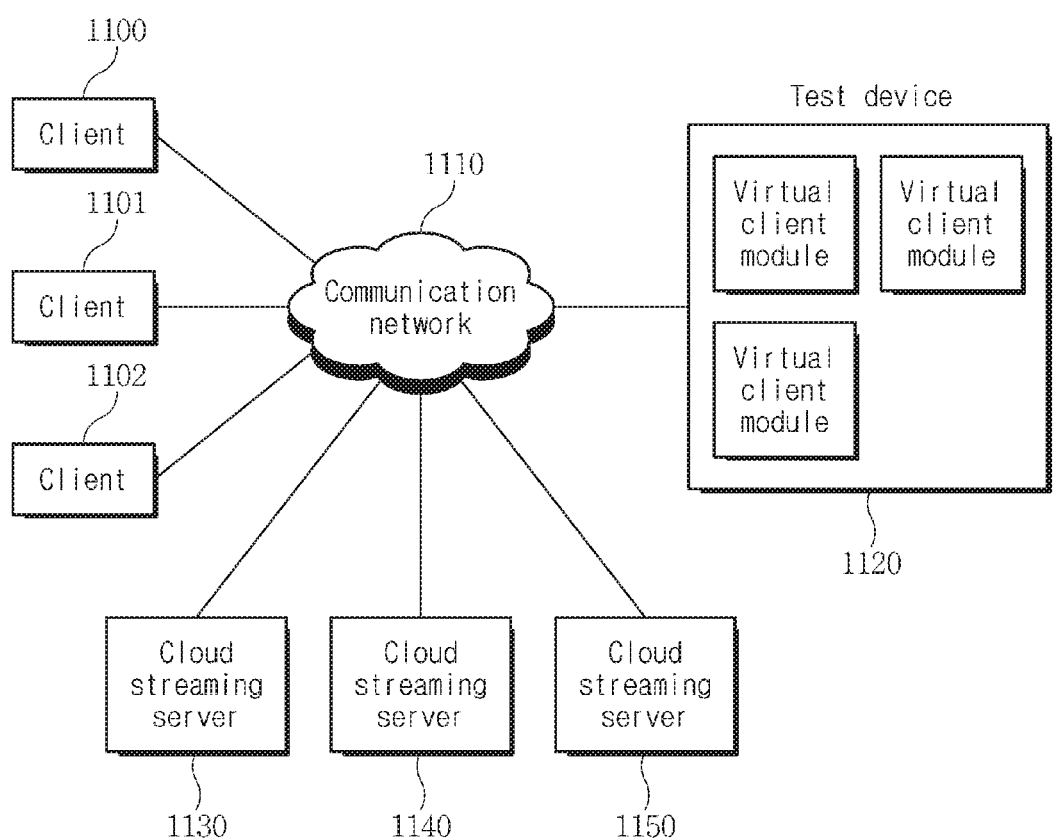
FIG. 11 is a block diagram illustrating a test system for a cloud streaming server according to an embodiment of the present invention.

FIG. 11 is a block diagram illustrating a test system for a cloud streaming server according to an embodiment of the present invention.

Referring to FIG. 11, a cloud streaming system to which this invention is applied includes a plurality of clients 1100, 1101 and 1102, connected to each other via a communication network 1110, and a plurality of cloud streaming servers 1130, 1140 and 1150. In order to test whether this cloud streaming system operates normally, the system further includes a test device 1120 having virtual client modules which are connected with the plurality of cloud streaming servers 1130, 1140 and 1150 and perform at least some functions of the clients 1100, 1101 and 1102.

Although the following embodiments illustrate three cloud streaming servers 1130, 1140 and 1150 and the test device 1120 having three virtual client modules, the number of the cloud streaming servers and the number of the virtual client modules are not limited thereto and may alternatively have various combinations depending on a need and design.

The above-mentioned client 1100, 1101 or 1102 refers to a device capable of transmitting and receiving various kinds of data via the communication network 1110, especially, a user's device for providing a cloud streaming service by accessing the cloud streaming server 1130, 1140 or 1150. For example, the client 1100, 1101 or 102 may be one of a tablet PC, a laptop, a personal computer (PC), a smart phone, a personal digital assistant (PDA), a smart TV, a mobile communication terminal, and a set-top box.

Additionally, the client 1100, 1101 or 1102 refers to a device that has a browser for communicating with the cloud streaming server 1130, 1140 or 1150 via the communication network 1110, a memory for storing a program and a protocol, a microprocessor for executing and controlling various kinds of programs, and the like. Namely, any device capable of communicating with the cloud streaming server 1130, 1140 or 1150 may be used as the client 1100, 1101 or 1102, including any communication computing apparatus such as a notebook computer, a mobile communication device, a PDA, and the like.

The client 1100, 1101 or 1102 may not only, for example, access the cloud streaming server 1130, 1140 or 1150 and request a specific service or function in response to a user input, but also receive, from the cloud streaming server 1130, 1140 or 1150, and output a resultant screen according to the execution of the requested service or function.

Additionally, the cloud streaming server 1130, 1140 or 1150 is an element for providing a specific service or function, especially a cloud streaming service, to a plurality of clients 1100, 1101 and 1102. For example, in order to provide a certain service or function, e.g., a service or function requiring a highly efficient image processing, regardless of an OS type, CPU performance, memory capacity, or other software and hardware specifications of the client 1100, 1101 or 1102, the cloud streaming server 1130, 1140 or 1150 may perform a service or function in response to a user input received from the client 1100, 1101 or 1102 and then transmit a resultant screen to the client 1100, 1101 or 1102. For this, the cloud streaming server 1130, 1140 or 1150 may have a screen virtualization function. Particularly, in order to test a normal operation or not (i.e., a failure or not), the cloud streaming server 1130, 1140 or 1150 may receive a predetermined test script key input and transmit a test result (a test result screen), created on the basis of the received input, to the respective virtual client modules of the test device 1120.

The communication network 1110 refers to a network, such as internet, intranet, mobile communication network, satellite communication network, and the like, capable of transmitting and receiving data through internet protocol by using various wired/wireless communication techniques. The communication network 1110 refers to a closed-type network such as a local area network (LAN) or a wide area network (WAN), an open-type network such as internet, a network such as a code division multiple access (CDMA), a wideband code division multiple access (WCDMA), a global system for mobile communications (GSM), a long term evolution (LTE), or an evolved packet core (EPC), a next-generation network to be realized in the future, and a computing network.

The test device 1120 is a device for testing whether the cloud streaming server 1130, 1140 or 1150 operates normally. The test device 1120 includes at least one virtual client module having at least some functions of the client 1100, 1101 or 1102.

In this test device 1120, the at least one virtual client module receives a test result from the at least one cloud streaming server 1130, 1140 or 1150. When the at least one virtual client module processes and outputs data of the received test result to a screen, the test device captures an outputted resultant image, compares the captured resultant image with a reference image corresponding to a normal operation of the cloud streaming server 1130, 1140 or 1150, and determines whether the at least one cloud streaming server has a failure. Specifically, the test device 120 compares a reference image with a resultant image. While a result, received when the specific cloud streaming server 1130 operates normally, passes through data processing such as decoding and then is outputted to the screen, the reference image is outputted at a certain capture time point. Also, while a test result, received from the specific cloud streaming server 1130, passes through data processing such as decoding and then is outputted to the screen, the resultant image is outputted at a certain capture time point. If both images are not identical with each other, it is determined that the specific cloud streaming server 1130 has a failure and thereby operates abnormally. If both images are identical with each other, it is determined that the cloud streaming server 1130 operates normally. In this case, the capture time point may be defined on the basis of a time point when a test result is transmitted from at least one cloud streaming server 1130, 1140 or 1150, or may be previously stored in the test device 120.

In this case, the reference image may correspond to a normal operation of at least one cloud streaming server 1130, 1140 or 1150, and may be captured from a normal operation resultant video created using a normal operation result corresponding to a predetermined test script key input. The reference image may be created by capturing an execution resultant video which is created as a result of a previous execution by the at least one cloud streaming server 1130, 1140 or 1150 and received from the virtual client module. Also, the at least one cloud streaming server 1130, 1140 or 1150 may send a result of capturing an execution resultant video to the virtual client module. In addition, the reference image may be received from any server or client module other than the at least one cloud streaming server 1130, 1140 or 1150. In this case, the screen created at the application by the predetermined test script key input may be a screen from which an animation effect is excluded. Therefore, this may prevent an error of a test result due to an animation or the like and also allow a reliable test.

In this invention, a single virtual client module may receive a test result from at least one cloud streaming server and then output the received test result as a resultant image. This resultant image is compared with a reference image corresponding to each cloud streaming server, and a comparison result is used for determining whether the specific cloud streaming server operates normally. Namely, based on a screen image provided to a user by one of the actual clients 1100, 1101 and 1102, a normal operation of not of the specific cloud streaming server 1130 is determined. For this, the test device 1120 may request the at least one cloud streaming server 1130, 1140 or 1150 to send a test result, and then each cloud streaming server 1130, 1140 or 1150 may transmit a test result in response to such a request signal. Additionally, the virtual client module for receiving and processing a test result transmitted from the at least one cloud streaming server 1130, 1140 or 1150 may be set in advance. Namely, at least one cloud streaming server 1130, 1140 or 1150 and at least one virtual client module may be mapped to one-to-one or many-to-one. Therefore, when requesting the at least one cloud streaming server 1130, 1140 or 1150 to send a test result, the test device 1120 may also transmit information about the virtual client module for receiving the test result. If the virtual client module is mapped to two or more cloud streaming servers, each of such servers may receive a request for a normal operation result to be used for creating a reference image. In addition, a time point of this request may be adjusted so as to sequentially receive and process test results from two or more cloud streaming servers 1130, 1140 and 1150.

Now, in the above-discussed system, the test device 1120 according to an embodiment of this invention will be described in detail with reference to FIGS. 12 and 13.

Figure 12:
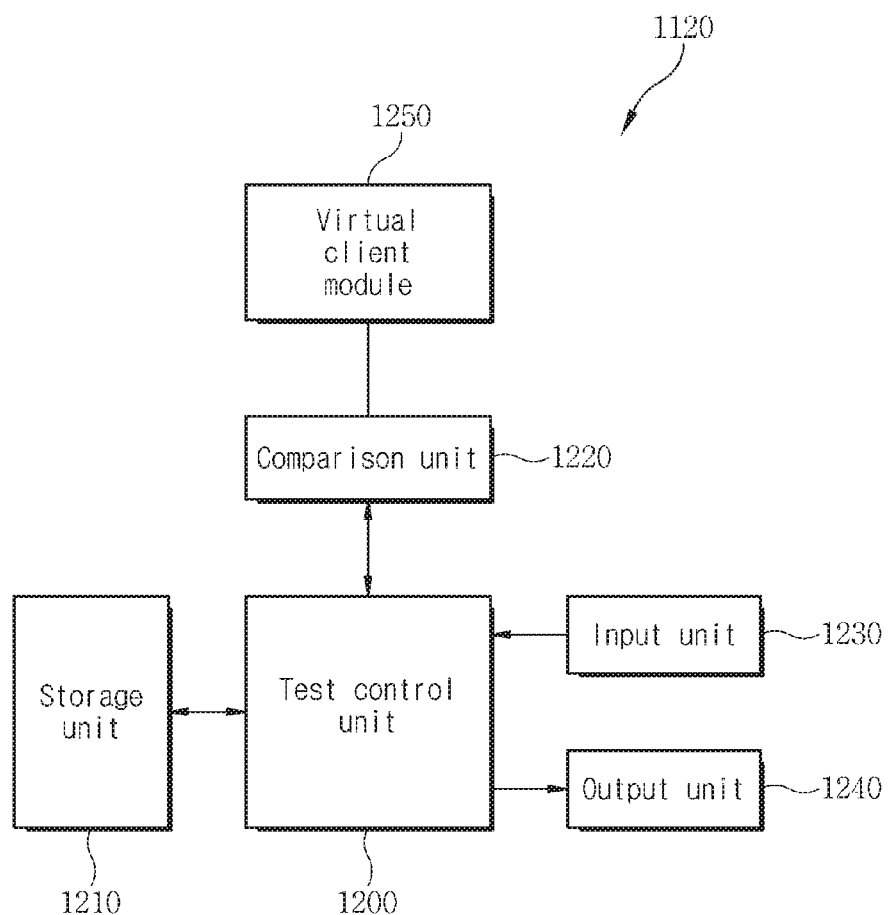
FIG. 12 is a block diagram illustrating a cloud streaming server test device according to an embodiment of the present invention.

First, referring to FIG. 12, the test device 1120 may include a test control unit 1200, a storage unit 1210, a comparison unit 1220, an input unit 1230, an output unit 1240, and a virtual 1250. Although one virtual client module 1250 is exemplarily shown in this embodiment, the number of the virtual client module 1250 may be varied depending on a system operation.

The test control unit 1200 performs the overall control required for determining whether there is a failure of the cloud streaming servers 1130, 1140 and 1150. When it is requested to determine a failure, the test control unit determines a failure or not of the cloud streaming server, based on a comparison result obtained through the comparison unit 1220, namely, depending on whether a resultant image created by capturing an output screen of a test result is identical with a reference image corresponding to a normal operation. In this case, a time point of a request for determination of a failure may be a time point when a test result is completely received to the virtual client module 1250, a time point when there is an input of a request for determination of a failure through the input unit 1230, or a predetermined periodic time point. Such a request for determining whether a failure occurs may depend on setting.

If compared two images are identical with each other, the test control unit 1200 determines that the cloud streaming server has no failure. If two images are not identical, the test control unit 1200 determines that the cloud streaming server has a failure.

The storage unit 1210 may store information required for the operation of the test device 1120. The storage unit 1210 stores information about a capture time point for capturing, at the same time as the reference image, a test resultant video as to a test result transmitted from at least one cloud streaming server 1130, 1140 or 1150. Further, the storage unit 1210 may store basic information about a test result transmitted from the cloud streaming server. Particularly, the storage unit 1210 may store in advance a reference image of a specific time point to be used for determining a failure or not of the cloud streaming server. The storage unit 1210 may include a magnetic media such as a hard disk, a floppy disk or a magnetic tape, an optical media such as a compact disk read only memory (CD-ROM) or a digital video disk (DVD), a magneto-optical media such as a floptical disk, a ROM, a random access memory (RAM), and a flash memory.

The comparison unit 1220 may request, under the control of the test control unit 1200, a delivery of a test resultant video received at the virtual client module 1250 and then outputted on a screen. Additionally, the comparison unit compares a test resultant image, created by capturing the test resultant video, with a reference image, and outputs a comparison result to the test control unit 1200. For this, the comparison unit 1220 may further perform a process of creating and storing the reference image. Namely, the comparison unit 1220 may compare a reference image, created by capturing a normal operation resultant video corresponding to a normal operation of the cloud streaming server, with a test resultant image created by capturing a test resultant video for a test of the cloud streaming server.

In this case, the test resultant image corresponding to the cloud streaming server may be captured at the same time point as the reference image.

The input unit 1230 may create a user input signal corresponding to a request or information of a cloud streaming server manager depending on such manager's manipulations. The input unit may be implemented by various input mechanisms which are currently commercialized or expected to be commercialized, including, for example, a normal input device such as a keyboard, a mouse, a joystick, a touch screen, a touch pad, etc., and a gesture input device which detects a user's motion and thereby creates a specific input signal.

The output unit 1240 is a device for allowing a user to perceive an operation result or status of the test device 1120, including, for example, a display unit for offering a visual output onto a screen, a speaker for outputting an audible sound, and the like. Particularly, in this invention, the output unit 1240 may output visually a resultant image processed and outputted from the virtual client module 1250, compare the resultant image with the reference image, output a comparison result, and display a failure or not of the cloud streaming server.

The virtual client module 1250, which virtualizes the client 1100, 1101 or 1102 that accesses the cloud streaming server 1130, 1140 or 1150 and is offered a cloud streaming service, may actually perform at least some functions of the client 1100, 1101 or 1102. For example, the virtual client module 1250 may access a specific cloud streaming server 1130, 1140 or 1150, receive a test result from the specific cloud streaming server 1130, 1140 or 1150, create a test resultant video by performing the same processing (e.g., decoding) with regard to the received test result as the client 1100, 1101 or 1102 performs, and output the created test resultant video on the screen through the output unit 1240. Also, in response to a request for a resultant image from the comparison unit 1220, the virtual client module 1250 may capture the resultant image outputted on the screen at a specific time point and then deliver it to the comparison unit 1220. This capture time point may be received from the comparison unit 1220 or previously set and stored. Capturing the resultant image may be performed, for example, in a manner of capturing image data stored in a frame buffer of the virtual client module 1250. In another embodiment, capturing the test resultant video and creating the test resultant image may be performed at the comparison unit 1220.

Namely, the virtual client module 1250 offers a predetermined test script key input to the cloud streaming server, receives a test result corresponding to the predetermined test script key input from the cloud streaming server, and creates a test resultant video by decoding the test result. In this case, the test result may be an encoded streaming video, and the test resultant video may be a decoded streaming video.

Particularly, the virtual client module 1250 may transmit the predetermined test script key input to the cloud streaming servers 1130, 1140 and 1150, receive test results corresponding to the predetermined test script key input from the cloud streaming servers 1130, 1140 and 1150, and then create test resultant videos. In this case, the screen created at the application by the predetermined test script key input may be a screen from which an animation effect is excluded. Using the predetermined test script key input for creating the screen from which an animation effect is excluded, an error of a test result may be prevented.

Figure 13:
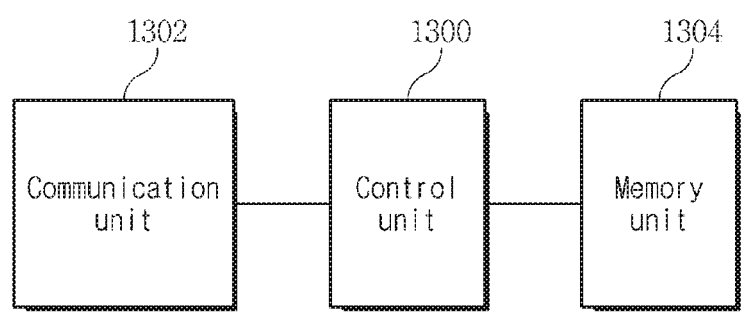
FIG. 13 is a block diagram illustrating a virtual client module for receiving and processing a test result according to an embodiment of the present invention.

The internal configuration of the virtual client module 1250 is as shown in FIG. 13.

Referring to FIG. 13, the virtual client module 1250 may include a control unit 1300, a communication unit 1302, and a memory unit 1304.

The virtual client module 1250 may be implemented by virtualizing a terminal device, e.g., one of a tablet PC, a laptop, a personal computer (PC), a smart phone, a personal digital assistant (PDA), a smart TV, a mobile communication terminal, and a set-top box, capable of receiving data provided from the cloud streaming server 1130, 1140 or 1150. Therefore, depending on the type of a terminal device, the virtual client module 1250 may have different configurations. Particularly, in this invention, the virtual client module 1250 may be implemented for performing further functions of receiving a test result, decoding the received test result, creating a test resultant video, and outputting the test resultant video to a screen.

The control unit 1300 performs the overall control of the virtual client module 1250. Particularly, in response to a request from the cloud streaming server 1130, 1140 or 1150, the control unit 1300 extracts a resultant image outputted on the screen at a specific time point and then delivers it to the comparison unit 1220. Further, the control unit 1300 may transmit a test result transmission request signal to the specific cloud streaming server 1130, 1140 or 1150 via the communication unit 1302. When sending the test result transmission request signal, the control unit 1300 may also send identification information of the virtual client module that will receive a test result. Also, based on a test schedule of a plurality of cloud streaming servers, the control unit 1300 may sequentially transmit the test result transmission request signal for each cloud streaming server.

The communication unit 1302 receives a test result from the cloud streaming server 1130, 1140 or 1150 through the communication network 1110. The communication unit 1302 may transmit and receive data in various manners of communication as well as in a wired or wireless manner. Further, the communication unit 1302 may transmit and receive data by using one or more communication schemes. For this, the communication unit 1302 may include a plurality of communication modules for transmitting and receiving data based on different communication schemes.

The memory unit 1304 stores information required for the operation of the virtual client module 1250. Particularly, the memory unit 1304 may store test results received from the cloud streaming servers 1130, 1140 and 1150. Further, the memory unit 1302 may store test resultant videos which are outputted on the screen by performing data processing for the received test results, and store in advance, depending on settings, information about a capture time point of the resultant image. The memory unit 1304 may include a magnetic media such as a hard disk, a floppy disk or a magnetic tape, an optical media such as a compact disk read only memory (CD-ROM) or a digital video disk (DVD), a magneto-optical media such as a floptical disk, a ROM, a random access memory (RAM), and a flash memory.

Now, a process of testing whether the cloud streaming server operates normally in the above-discussed test system will be described in detail with reference to FIGS. 14 and 15.

Figure 14:
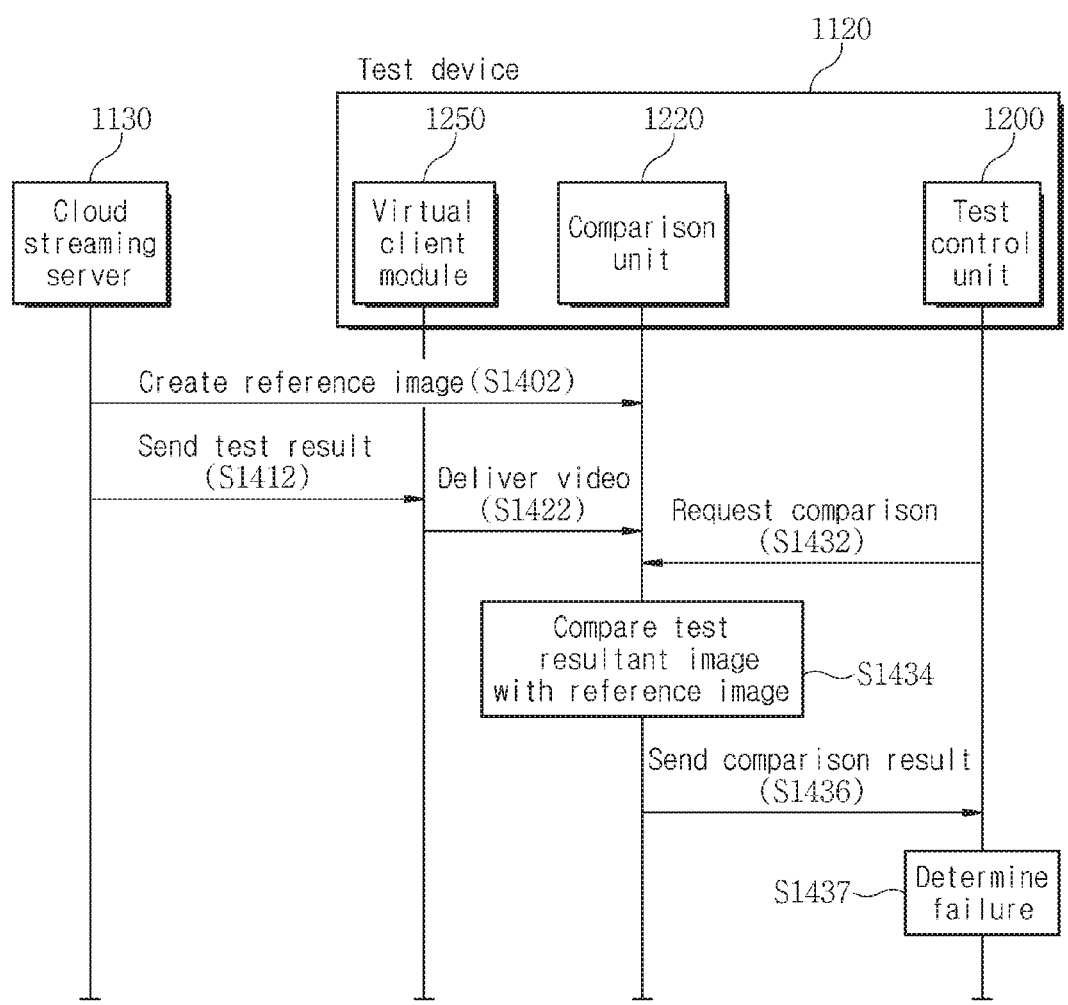
FIG. 14 is a flow diagram illustrating a test process of a test system for a cloud streaming server according to an embodiment of the present invention.

FIG. 14 is a flow diagram illustrating a test process of a test system for a cloud streaming server according to an embodiment of the present invention.

The cloud streaming server 1130 creates a reference image corresponding to a normal operation (S1402) thereof. Namely, when the cloud streaming server 1130 operates normally, the reference image may be created by capturing a normal operation resultant video created using a result of a normal operation corresponding to a predetermined test script key input. A capture time point may be set on the basis of a time point when the normal operation result is transmitted from the cloud streaming server 1130, or stored in advance in the test device 1120.

The cloud streaming server 1130 transmits a test result to the virtual client module 1250 of the test device 1120 (S1412). Also, a single virtual client module may receive test results sequentially with a time difference from a plurality of client streaming servers.

At this time, the cloud streaming server 1130 may transmit a test result in response to the predetermined test script key input of the virtual client module 1250. In this case, a screen created at an application by the predetermined test script key input may be a screen from which an animation effect is excluded.

The virtual client module 1250 creates a test resultant video by decoding the test result received from the cloud streaming server 1130 and provides the test resultant video to the comparison unit 1220 (S1422). At this time, the provision of the test resultant video may be performed in response to a test request from the test control unit 1200. Also, the comparison unit 1220 may request the virtual client module 1250 to deliver the test result received from the cloud streaming server 1130. In this case, the virtual client module 1250 may create a test resultant video by processing the received test result as if being actually processed by the client 1100, 1101 or 1102, and then output the created video to the screen. In this case, the test resultant video outputted to the screen at a time point required by the comparison unit 1220 or at a predetermined specific time point may be captured and transmitted to the comparison unit 1220. Namely, creating a test resultant image by capturing the test resultant video may be performed by the virtual client module 1250 or the comparison unit 1220.

When there is an input, or when any execution condition is satisfied, the test control unit 1200 requests the comparison unit 1220 to compare the reference image with the test resultant image (S1432).

The comparison unit 1220 that receives the comparison request compares the test resultant image, captured from the received test resultant video, with the reference image and then delivers a comparison result to the test control unit 1200 (S1434, S1436).

Then, depending on the comparison result, the test control unit 1200 determines whether there is a failure in the cloud streaming server (S1437). At this time, if the received comparison result indicates that the captured resultant image is not identical with the reference image corresponding to a normal operation, it is determined that the cloud streaming server has a failure. If both images are identical, it is determined that the cloud streaming server has no failure.

Figure 15:
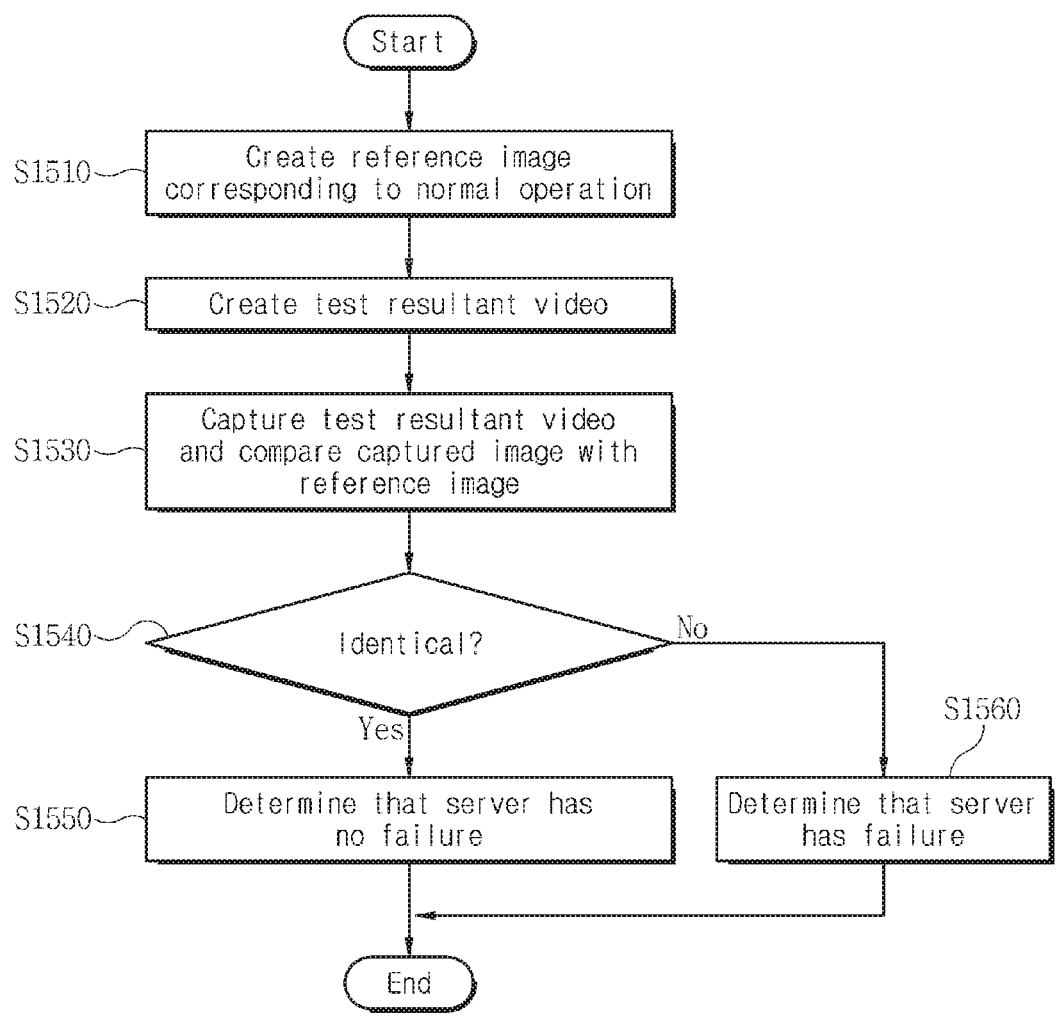
FIG. 15 is a flow diagram illustrating a cloud streaming server test method according to an embodiment of the present invention.

FIG. 15 is a flow diagram illustrating a method for testing whether the cloud streaming servers 1130, 1140 and 1150 operate normally, at the test device 1120 according to an embodiment of the present invention.

Referring to FIG. 15, the cloud streaming server test method according to an embodiment of this invention creates a reference image corresponding to a normal operation of the cloud streaming server (S1510).

At this time, the reference image may correspond to a normal operation of the cloud streaming server and may be captured from a normal operation resultant video created using a normal operation result corresponding to a predetermined test script key input.

In this case, a screen created at an application by the predetermined test script key input may be a screen from which an animation effect is excluded.

Additionally, in the cloud streaming server test method according to an embodiment of this invention, the virtual client module creates a test resultant video by receiving a test result corresponding to the predetermined test script key input from the cloud streaming server (S1520).

Also, the cloud streaming server test method according to an embodiment of this invention creates a test resultant image by capturing the test resultant video and then compares the test resultant image with the reference image (S1530).

At this time, the test resultant image corresponding to the cloud streaming server may be capture at the same time as the reference image.

This step S1530 of creating the test resultant image may be performed by the virtual client module 1250 or the comparison unit 1220 as shown in FIG. 12.

Also, as a result of comparison at step S1530, the cloud streaming server test method according to an embodiment of this invention determines whether the test resultant image and the reference image are identical with each other (S1540).

If identical, the cloud streaming server test method according to an embodiment of this invention determines that the cloud streaming server has no failure (S1550).

If not identical, the cloud streaming server test method according to an embodiment of this invention determines that the cloud streaming server has a failure (S1560).

The respective steps shown in FIG. 15 may be performed in the illustrated order, or in the reverse order, or simultaneously.

A computer-readable storage medium, e.g., a recording medium, suitable for storing computer program instructions and data includes magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), a flash memory, an erasable programmable ROM (EPROM), and an electrically EPROM (EEPROM). A processor and memory may be supplemented by or integrated with specific-purpose logical circuit. Program commands may include high-class language codes, which can be executed in a computer by using an interpreter, as well as machine codes made by a compiler. The aforementioned hardware device may be configured to operate as one or more software modules in order to perform the operation of this invention, and vice versa.

While this disclosure contains many specific implementation details, these should not be construed as limitations on the scope of the invention or of what may be claimed, but rather as descriptions of features that may be specific to particular embodiments of particular invention. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While this disclosure has been particularly shown and described with reference to an exemplary embodiment thereof, it will be understood by those skilled in the art that various changes in form and details may be made therein without departing from the scope of this disclosure as defined by the appended claims.

According to this invention, it is possible to capture a cloud streaming service screen, to load and encode data from a buffer for temporarily storing the data corresponding to the captured cloud streaming service screen, to determine whether a bottleneck occurs in the buffer, and to compress data temporarily stored in the buffer, depending on a determination result. Further, it is possible to prevent in advance the bottleneck that may occur in the cloud streaming service system due to an increase of data traffic, so that the streaming service can be smoothly provided to service users and also the data traffic can be adjusted without additional cost.

Additionally, according to this invention, it is possible to receive a service request from a user's terminal device, to identify a type of a cloud streaming service corresponding to the service request, to assign a priority to the cloud streaming service, based on the type of the cloud streaming service, to determine whether a streaming pipeline capable of simultaneously processing in parallel the cloud streaming service reaches a limit of simultaneous service processing, and to provide the cloud streaming service according to the priority, based on a result of determination. Further, the server is able to provide services to a larger number of clients smoothly, and can provide more cloud streaming services without increasing the number of servers, resulting in cost savings.

Additionally, this invention relates to a system for testing whether a cloud streaming server for providing a specific service is operating normally. In particular, it is possible to check whether a server for providing a cloud streaming service is operating normally. It is therefore possible to prevent in advance a transmission error or a failure that may occur when data is transmitted from the cloud streaming server, and also prevent an error from spreading in the test result. This can contribute to the development of the industry by stabilizing the cloud streaming service and improving the service quality.

What is claimed is:

1. A cloud streaming server comprising:
a processor; and
a memory storing instructions thereon, the instructions when executed by the processor cause the processor to:
receive a request for a cloud streaming service from a user's terminal device;
identify the requested cloud streaming service as one of a plurality types of cloud streaming services at least based on presence or absence of a command for setting an audio device after receiving the request, the types of the cloud streaming services comprising a first type of service in which the command is received after receiving the request and a second type of service in which the command is absent after receiving the request;
assign a priority to the cloud streaming service, based on the identified type of the cloud streaming service, the second type of service assigned with a higher priority than the first type of service; and
determine whether a streaming pipeline capable of simultaneously processing in parallel the cloud streaming service reaches a limit of simultaneous service processing, and to provide the cloud streaming service according to the priority of the cloud streaming service.

2. The cloud streaming server of claim 1, wherein the instructions cause the processor to ignore the ignores the command received before receiving the request.

3. The cloud streaming server of claim 1, wherein the first type of service is a video streaming service and the second type of service is a service other than the video streaming service.

4. The cloud streaming service of claim 1, wherein the second type of service comprises game applications.

5. The cloud streaming service of claim 1, wherein the command is OPEN command of multimedia control interface (MCI) for a sound device.

6. A method of providing cloud streaming service, comprising:
receiving, by a cloud streaming server, a request for a cloud streaming service from a user's terminal device;

identifying the requested cloud streaming service as one of a plurality types of cloud streaming services at least based on presence or absence of a command for setting an audio device after receiving the request, the types of the cloud streaming services comprising a first type of service in which the command is received after receiving the request and a second type of service in which the command is absent after receiving the request;

assigning a priority to the cloud streaming service, based on the identified type of the cloud streaming service, the second type of service assigned with a higher priority than the first type of service; and a service providing unit configured to determine whether a streaming pipeline capable of simultaneously processing in parallel the cloud streaming service reaches a limit of simultaneous service processing, and to provide the cloud streaming service according to the priority of the cloud streaming service.

7. The method of claim 6, further comprising ignoring the command if the command received before receiving the request.

8. The method of claim 6, wherein the first type of service is a video streaming service and the second type of service is a service other than the video streaming service.

9. The method of claim 6, wherein the second type of service comprises game applications.

10. The method of claim 6, wherein the command is OPEN command of multimedia control interface (MCI) for a sound device.

11. A non-transitory computer readable storage medium storing instruction thereon, the instructions when executed by a processor cause the processor to:

receive a request for a cloud streaming service from a user's terminal device;

identify the requested cloud streaming service as one of a plurality types of cloud streaming services at least based on presence or absence of a command for setting an audio device after receiving the request, the types of the cloud streaming services comprising a first type of service in which the command is received after receiving the request and a second type of service in which the command is absent after receiving the request;

assign a priority to the cloud streaming service, based on the identified type of the cloud streaming service, the second type of service assigned with a higher priority than the first type of service; and determine whether a streaming pipeline capable of simultaneously processing in parallel the cloud streaming service reaches a limit of simultaneous service processing, and to provide the cloud streaming service according to the priority of the cloud streaming service.

12. The non-transitory computer readable storage medium of claim 11, wherein the instructions further cause the processor to ignore the command if the command received before receiving the request.

13. The non-transitory computer readable storage medium of claim 11, wherein the first type of service is a video streaming service and the second type of service is a service other than the video streaming service.

14. The non-transitory computer readable storage medium of claim 11, wherein the second type of service comprises game applications.

15. The non-transitory computer readable storage medium of claim 11, wherein the command is OPEN command of multimedia control interface (MCI) for a sound device.

* * * * *